United States Patent [19]

Minnich et al.

[11] Patent Number: 5,187,417

[45] Date of Patent: Feb. 16, 1993

[54] MOTOR CONTROL APPARATUS AND METHOD

[75] Inventors: Thomas Minnich, Franklin; Alfred H. Morser, Cincinnati; Stanley L. Myers, Cincinnati; Stephen T. Walsh, Cincinnati, all of Ohio

[73] Assignee: Cincinnati Milacron Inc., Cincinnati, Ohio

[21] Appl. No.: 770,744

[22] Filed: Oct. 3, 1991

Related U.S. Application Data

[63] Continuation of Ser. No. 563,368, Aug. 6, 1990, abandoned.

[51] Int. Cl.[5] .............................................. H02P 6/02
[52] U.S. Cl. .................................... 318/254; 318/138; 318/600
[58] Field of Search ............... 318/138, 254, 432, 433, 318/439, 569, 600

[56] References Cited

U.S. PATENT DOCUMENTS

| | | | |
|---|---|---|---|
| 4,400,654 | 8/1983 | Elliott | 318/312 |
| 4,651,068 | 3/1987 | Meshkat-Razavi | 318/254 |
| 4,686,437 | 8/1987 | Langley et al. | 318/254 |
| 4,879,498 | 11/1989 | Shinohara et al. | 318/254 |
| 4,879,502 | 11/1989 | Endo et al. | 318/723 |
| 4,914,361 | 4/1990 | Tajima et al. | 318/254 |
| 4,980,617 | 12/1990 | Tajima et al. | 318/254 |
| 4,988,273 | 1/1991 | Faig et al. | 425/145 |
| 5,012,166 | 4/1991 | Ushijima et al. | 318/254 |
| 5,043,642 | 8/1991 | Ohi | 318/254 |
| 5,047,699 | 9/1991 | Rozman et al. | 318/254 |

Primary Examiner—Bentsu Ro
Attorney, Agent, or Firm—John W. Gregg

[57] ABSTRACT

An apparatus and method for controlling brushless DC motors are provided. Velocity loop control is performed digitally to produce current commands at a high frequency loop closure interval. Commutation of field coil current is controlled in response to current commutation pattern control signals produced in response to measured relative position of the motor rotor and motor stator and a velocity average over a number of loop closure intervals. Switch control signals to control transistor switches providing current from a DC power source to the motor terminals are produced in response to the current commands, measured motor current and the commutation pattern control signals. The velocity loop control implements a selected transfer function relating velocity, the motor torque constant, and the moment of inertia of the motor and associated load. Facilities are provided for periodically adjusting velocity loop transfer function gain factors and the effective moment of inertia in response to input signals. Additionally, current loop amplification gain factors and time constants are made selectable by input signals.

46 Claims, 12 Drawing Sheets

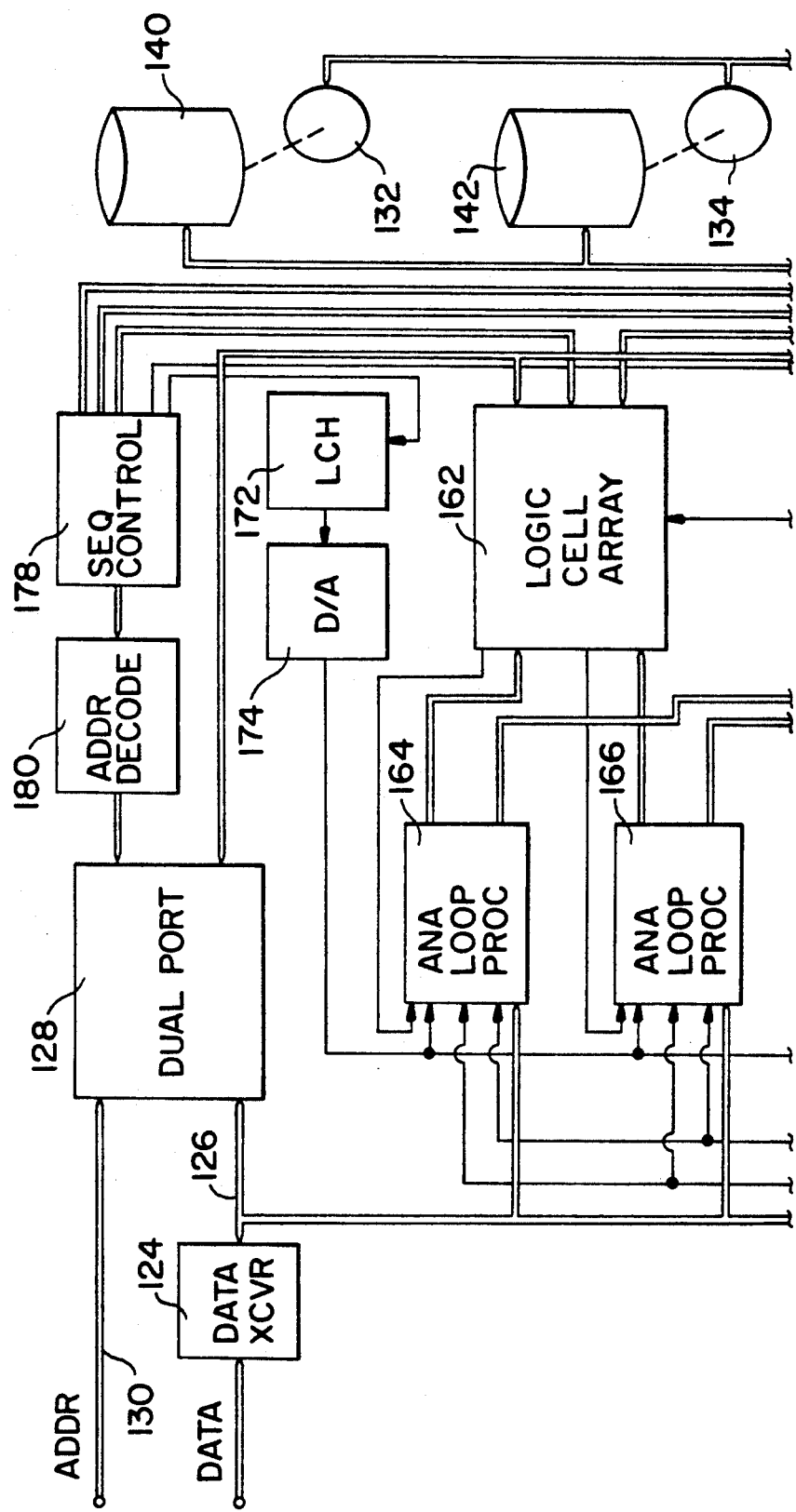

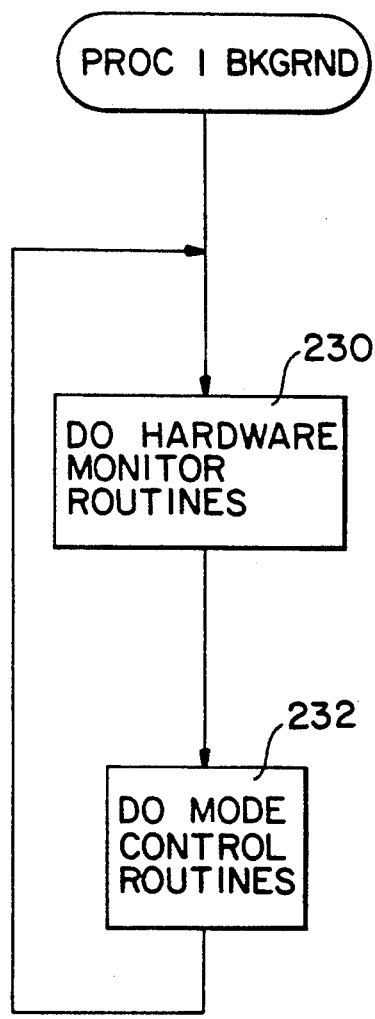

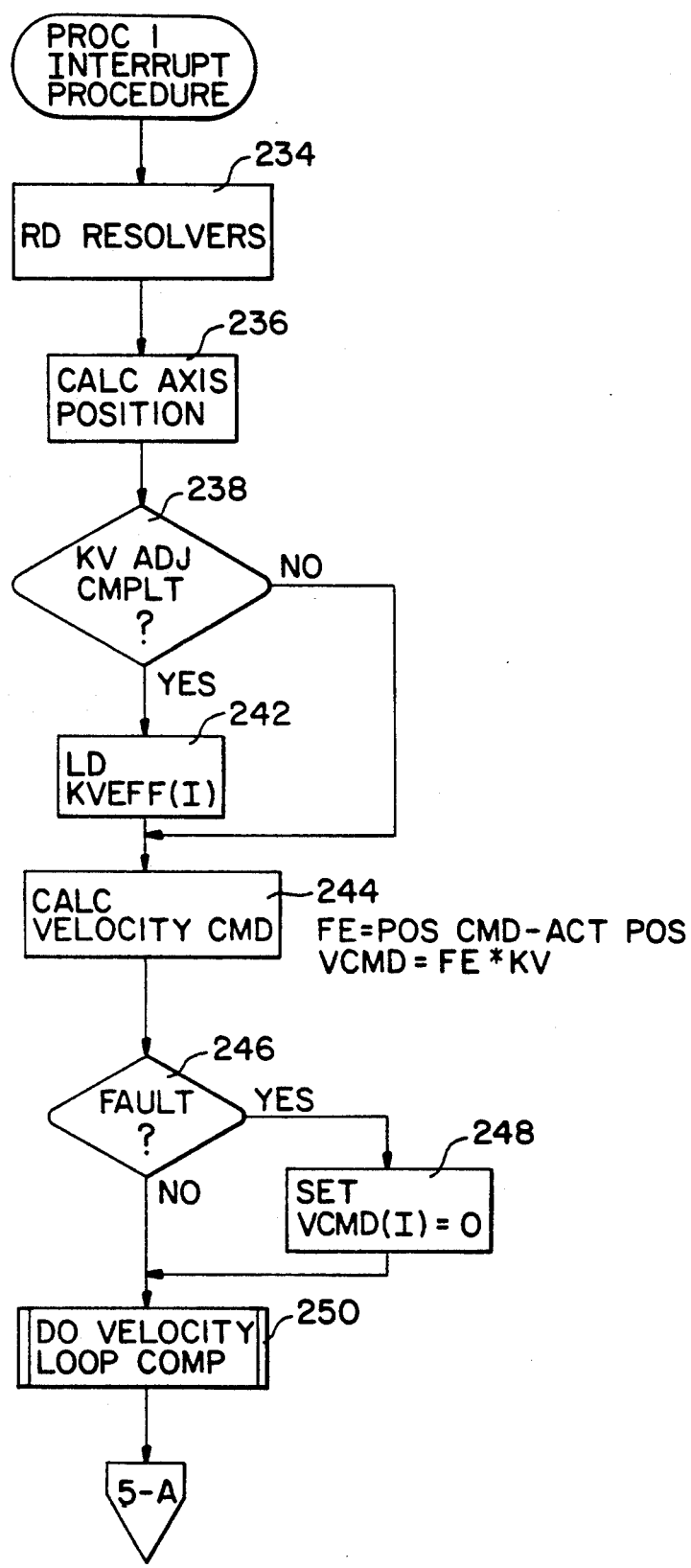

FIG. 9

MOTOR CONTROL APPARATUS AND METHOD

RELATED APPLICATIONS

This is a continuation of copending U.S. patent application Ser. No. 563,368 filed Aug. 6, 1990, now abandoned.

BACKGROUND OF THE INVENTION

I. Field of the Invention

This invention relates generally to controls for motors. In particular, this invention relates to controls for brushless DC motors.

II. Description of the Prior Art

Brushless DC motors of the type of interest herein are constructed to have a plurality of field coils arranged in a stator and a rotor rotatable relative thereto having a plurality of permanent magnetic pole pieces arranged therein. Such motors permit control of velocity over a wide range as is inherent with DC motors and eliminate the inherent disadvantages of brush wear and attendant loss of motor performance. "Commutation" of current in motors of this type occurs in the field coils and is accomplished by electronically controlled switches. The commutation of current in the field coils necessitates the detection of rotor position to identify the coils to which energy is to be applied to produce the desired torque.

It is known to control brushless DC motors with primarily analogue devices providing the desired compensation of the motor and control responses to effect a desired motor performance. In such known controls, commutation may be effected at the switching stage by direct application of the output of the rotor position transducer. To this end it is common to use a Hall effect transducer mounted to the motor rotor to determine rotor relative position and control the field coil current switches. In such control systems measurement of motor angular velocity, required for control of torque, is typically accomplished by a conventional tachogenerator. When it is desired to measure position of a machine element driven by the motor, further position transducers are used.

The known analogue controls for brushless DC motors suffer the disadvantage of requiring manual adjustment at the control device of variable parameters and lack programmable adaptability for large variations in motor sizes, loads and speeds. Further, the use of the various dedicated transducers described above in conjunction with such known control systems increases the cost of such systems, while adding to the complexity thereof, thereby reducing overall reliability.

SUMMARY OF THE INVENTION

It is an object of the present invention to provide a control for brushless DC motors wherein servomechanism control loops for position, velocity, and torque are completed using a single position transducer.

It is a further object of the present invention to provide a control for brushless DC motors wherein control parameters including parameters of a transfer function representing the motor response are programmable.

It is a still further object of the present invention to provide a control for a brushless DC motor wherein commutation of current between field coils is effected in response to a control algorithm defining a desired relationship of motor torque, rotor position, and rotor velocity.

In accordance with the aforesaid objects, the present invention provides a control for brushless DC motors wherein position and velocity servomechanism control is effected by programmable processors operating in a sampled data mode to perform closed loop velocity control. The processors produce instantaneous current command signals defining a desired motor current to be effective over a predetermined time interval. The periodic production of current commands permits adjustment of parameters used to implement a selected control type. The adjustable parameters include velocity and current loop gain factors, and axes moments of inertia. A programmable analogue processor effects generation of pulse-width-modulation (PWM) control signals in response to the current command signals and the measured motor current. Commutation of current from coil to coil is controlled by a predictive algorithm in response to the measured rotor relative position and an average rotor velocity derived therefrom. Rotor position in the predetermined time interval is predicted from the last measured position and the calculated velocity to determine when commutation is to occur. The control enables the use of a single transducer of rotor position to provide the desired input for commutation control, position control, and velocity control of the motor rotor.

Further objects and advantages of the present invention shall become apparent from the accompanying drawings and the following description thereof.

BRIEF DESCRIPTION OF THE DRAWINGS

FIGS. 5a and 5b are flow charts illustrating the cycle of operation of a first signal processor of the module of FIG. 3.

FIG. 9 is a circuit diagram of an analogue current loop processing module included in the interface module of FIG. 4.

DETAILED DESCRIPTION OF THE PREFERRED EMBODIMENT

To illustrate the invention, a motor control developed by Cincinnati Milacron Inc., the assignee of the present invention, shall be described in detail. While this motor control represents a preferred embodiment of the invention, the description thereof is not intended to be in any way limiting in respect of the scope of the invention which is defined by the appended claims and all equivalents thereof.

The motor control of the present invention is particularly advantageously adapted to control brushless DC motors used as actuators for effecting motion of machine moveable members. In such applications, desired motor performance may vary with the task being performed thereby making it desirable to be able to adapt motor performance to changing requirements.

Figure 1:
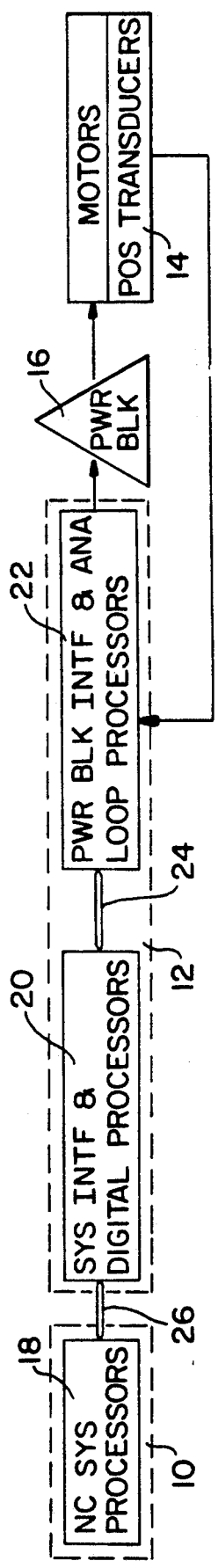
FIG. 1 is an overall functional block diagram of a machine control and the motor control of the present invention.

Referring to FIG. 1, a numerical control system 10 is connected to a motor control system 12 which provides an interface between the numerical control 10 and the motors and position transducers 14. The motor control system operates typically at low level signals and power for the motors is derived typically from a multiphase alternating current power source which is rectified and applied through switching devices located at a power block module 16. The switching devices, typically transistors, are controlled by pulse-width modulation signals to achieve a desired instantaneous motor current and hence a desired instantaneous torque.

The present invention provides for data exchange between the numerical control system processors 18 and a digital signal processing module 20 of the motor control 12. The digital signal processing module receives data defining values for parameters used to control the motors and receives position command data from the NC system processors 18. The digital signal processing module 20 converts the position command data and the control parameter data to servo mechanism loop specific data which is transferred to the power block and transducer interface module 22. Position data from motor position transducers as well as from machine member position transducers is generated by the interface module 22 which provides the excitation signals for the transducers and detects the positions measured by the transducers from their output signals. In addition, interface module 22 provides the pulse-width modulation control signals for the power transistors of power block 16.

In addition to position data, the interface module 22 produces digital representations of the commanded motor current, actual motor current, and the difference therebetween, designated as current error. This data is available from the interface module 22 for access by the digital signal processing module 20. The signal processing module makes the data derived from interface module 22 available to the numerical control system processors 18.

It will be understood by those skilled in the art that the numerical control 10 periodically produces position command data for each of the movable machine members. The motion of these machine members is effected by motors controlled by motor control 12. The rate at which the position command data changes is dependent upon the rate of motion of the machine members. However, the rate at which new position command data is produced may be constant, defining a position command data update interval. In contrast to the update interval, the rate of commutation of current among the motor stator windings is dependent upon the construction of the motor being controlled and the rate of rotation of the motor rotor relative to the motor stator. Therefore, motor control 12 must accommodate the fixed update interval of the numerical control 10 and the variable interval of commutation dictated by the commanded motor velocities.

NUMERICAL CONTROL

Figure 2:
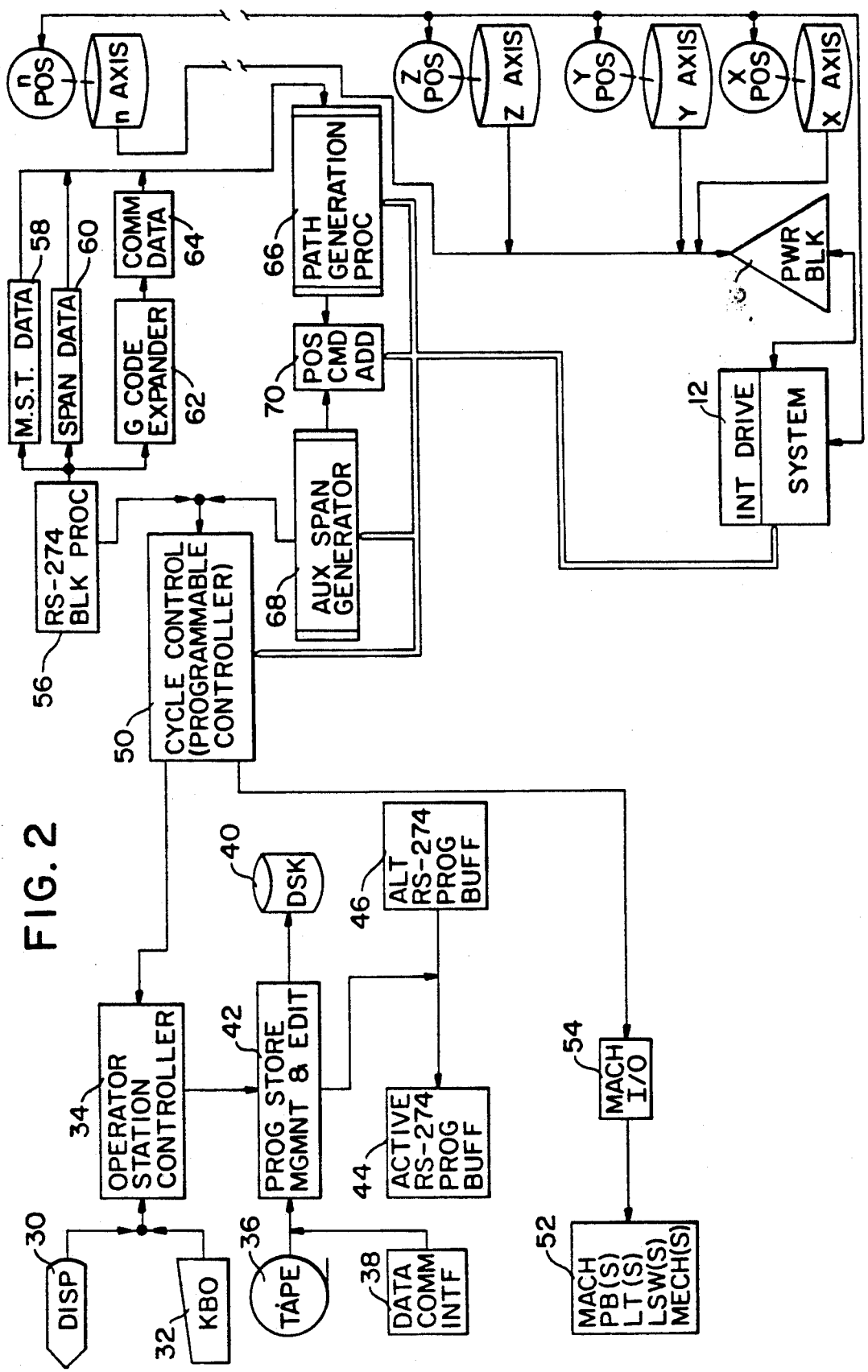
FIG. 2 is a block diagram of a machine control with which the motor control of the present invention may advantageously be used.

Additional details of the numerical control 10 of FIG. 1 shall be described with reference to the block diagram of FIG. 2. The numerical control includes: an operator or user interface; machine mechanism interface and control; program storage and edit facilities; machine cycle control; and work piece program processing and path generation control.

The operator interface includes a display device 30 such as a CRT or other alphanumeric display device, a manual data entry device such as keyboard 32 and an operator station controller 34. The operator station controller receives data to be displayed from the NC system processors 18 and formats the data for the display device 30. Manual data entries from the keyboard 32 are encoded by operator station controller 34 for distribution to other numerical control system elements. Operator station controller 34 enables manual data input in accordance with the active mode of operation of the machine as determined by the cycle control.

In addition to manual data input, workpiece programs may be entered into local storage of the control by means of bulk data transfer devices such as, for example a tape reader 36 or a data communication interface 38. Bulk storage of workpiece programs is provided on disk store 40. A program storage and edit controller 42 manages the communication of data from the input devices 36 and 38 to and from the bulk store 40 as well as to and from the operator station controller 34. Two workpiece program buffers 44 and 46 are provided for active and alternative workpiece programs. Program instructions are transferred for execution from the active buffer 44. The alternative buffer 46 provides storage for a program which may be edited while execution of a program goes forward.

The over all cycle of operation of the numerical control 10 is controlled by the cycle control 50. Cycle control 50 operates as a conventional programmable controller to execute control programs relating machine push buttons, lights, limit switches and mechanisms such as transmissions, tool changers, workpiece transfer devices and so forth and the cycle of operation of the controlled machine. The machine elements are indicated generally by block 52 and are monitored and controlled through a machine input-output interface 54. In control of the cycle of operation of the machine, cycle control 50 effects transfer of workpiece program instructions from the active buffer 44 to a block processor 56. Further, cycle control 50 monitors the machine status and effects the appropriate response to error conditions.

Workpiece programs consist of blocks of instructions containing coordinate data, feed rate data, tool data, spindle speed data, miscellaneous function data and cycle control codes. The block processor 56 decodes each block of instructions and distributes the data as appropriate for control of machine functioning. Miscellaneous function, spindle speed and tool data associated with machine functions such as tool selection, transmission speed changes and mechanism control are placed in the data store 58. Coordinate data specifying end points for the machine member axes of motion are placed in the data store 60. Code expander 62 operates on cycle control codes to effect selection of commissioning data from the commissioning data store 64 and to select the desired mode of path generation.

Path generation processor 66 produces coordinate axis position commands for each update interval in accordance with the machine operations specified by the active workpiece program instructions. The position commands produced by path generation processor 66 reflect the rate of change of position of all machine axes as defined by the programmed coordinates, feed rates, and cycle commands. In addition to the path generation processor 66, coordinate axis position commands may be generated by an auxiliary span generator 68. Auxiliary span generator 68 produces motion commands in association with machine activity according to specifications of the particular machine and the desires of the machine builder. For example, the auxiliary span generator may generate motion commands to effect movement to predetermined locations desired to effect tool or workhead changes or in response to operator input. While it is not customary that commands derived from workpiece program data are executed simultaneously with commands generated by the auxiliary span generator, the design of the control accommodates such simultaneous execution by providing for summation of the commands at the position command summer 70. The result of this summation is then output to the motor control 12.

In applicants' preferred embodiment communication between the motor control 12 and NC systems processors 18 is accomplished over a data bus conforming to the IEEE 796-88 signal specification for the P1 connector. Data entered under control of the operation station controller 34 or from the workpiece program as well as data from commissioning data store 64 are all available over the data bus 26 to the motor controller 12.

A detailed description of the motor controller 12 will be given with reference to the block diagrams of FIGS. 3 and 4. The digital signal processing module 20 is shown in detail in the block diagram of FIG. 3. This module receives the position command data from the numerical control 10 at the update interval, retrieves position transducer output signal data from the interface module 22 and periodically produces current commands and commutation pattern control signals in response thereto. In addition to velocity control effected by the position loop implemented by signal processing module 20, velocity commands may be entered directly from numerical control 10 to provide velocity feed forward or for control in velocity only fashion rather than derivative as in position loop control. The current command signals are produced by a digitally implemented velocity control loop and the commutation pattern control signals are derived from the time sampled measured rotor relative position and average actual rotor relative velocity. Additionally, a torque command may be entered directly from the numerical control 10 to effect torque feed forward as may be done to counterbalance known loads presented to the motors.

SIGNAL PROCESSING MODULE

As noted above, data is exchanged between the NC system a system data bus 26. Data is exchanged between the digital signal processing module 20 and the interface module 22 via a dedicated motor controller bus 24 providing independent data and address lines.

Signal processing module 20 employs digital signal processors 80 and 86 to perform the calculations required to generate the current command signals and the commutation pattern control signals. Applicants have chosen the TMS 20C25 digital signal processors available from Texas Instruments Incorporated. Programs executed by signal processor 80 are stored in local memory 84 and include: position calculation routines 200; position loop calculation routines 202; velocity loop calculation routines 204; commutation control routines 206; hardware monitor routines 208; and, machine state transition control routines 210. Likewise signal processor 86 operates in conjunction with programs stored in memory 90 including: mode and enable command processing routines 212; motor average velocity calculation routines 214; sub-span interpolation routines 216; torque command conversion routines 218; position loop gain adjust calculation routines 220; velocity loop gain adjust calculation routines 222; machine state transition control routines 224; and, servo error processing routines 226.

The signal processors 80 and 86 include built-in address and data busses which are independently connected to the system busses as will be further described herein. The data bus 26 provides separate signal lines for address data exchanged through the system bus address driver 72. System bus data is exchanged through data transceiver 74. System data bus 26 provides additional signal lines for interrupt signals which are connected at the interrupt interface 76. Local memory to support the exchange of data over the bus is provided in a random access memory 78. Data associated with servo system bus 24 is exchanged through the data transceiver 92 and servo system bus addresses are exchanged through the address driver 94.

Figure 4:
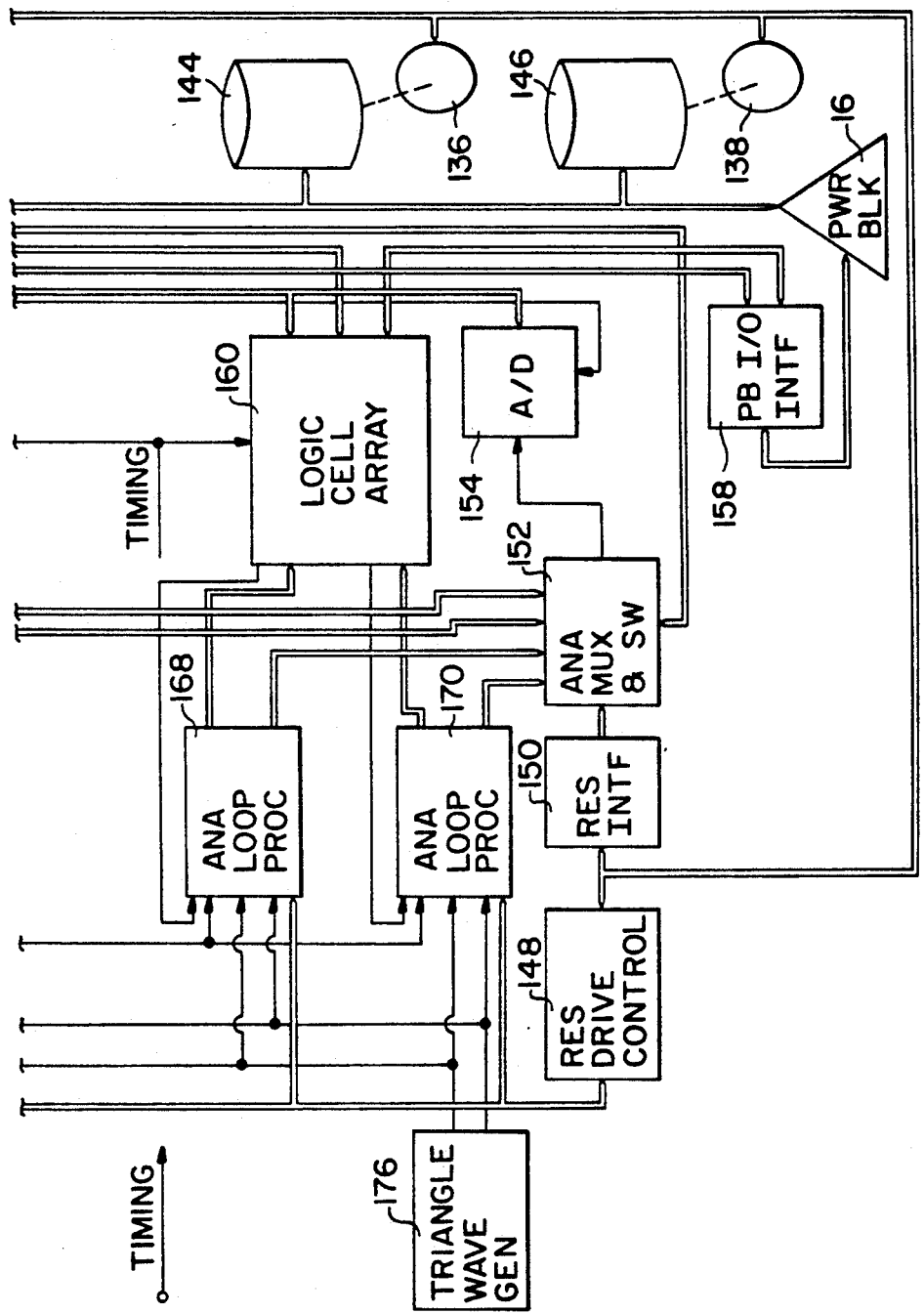
FIG. 4 is a block diagram of the motor and position transducer interface module of the motor control of FIG. 1.

Continuing with reference to FIG. 4 and considering signal processor 80, address buffer 110 is interposed between the address bus of signal processor 80 and the immediate address bus 112 serving program store 84. In a like manner address driver 104 is interposed between the address bus of signal processor 80 and a local address bus 106 serving system bus address driver 72 and memory 78. A data bus buffer 96 is interposed between the data bus of signal processor 80 and program store 84. Data transceiver 98 is interposed between the signal processor 80 data bus and a local data bus 100 serving system bus data transceiver 74 and memory 78. The address and data busses of processor 80 are connected to, respectively, servo system address buffer 94 and servo system data transceiver 92. Functions performed by signal processor 80 are primarily directed to position and velocity loop control associated with generation of current command signals, hence the direct connection to the servo system bus through transceiver 92 and buffer 94.

Considering processor 86, address driver 108 is interposed between the address bus of signal processor 86 and the local address bus 106 serving the system address driver 72 and memory 78. Address buffer 114 is interposed between the address bus of signal processor 86 and the immediate address bus 116 connecting data store 88, which provides storage for variable data used by processor 86, and program store 90. Data buffer 122 is interposed between the data bus of signal processor 86 and the data channels of data store 88 and program store 90. Data transceiver 102 is interposed between the data bus of signal processor 86 and the local data bus 100 serving system data bus transceiver 74 and memory 78. Variable data used by processor 86 is stored in data store 88.

Figure 3:
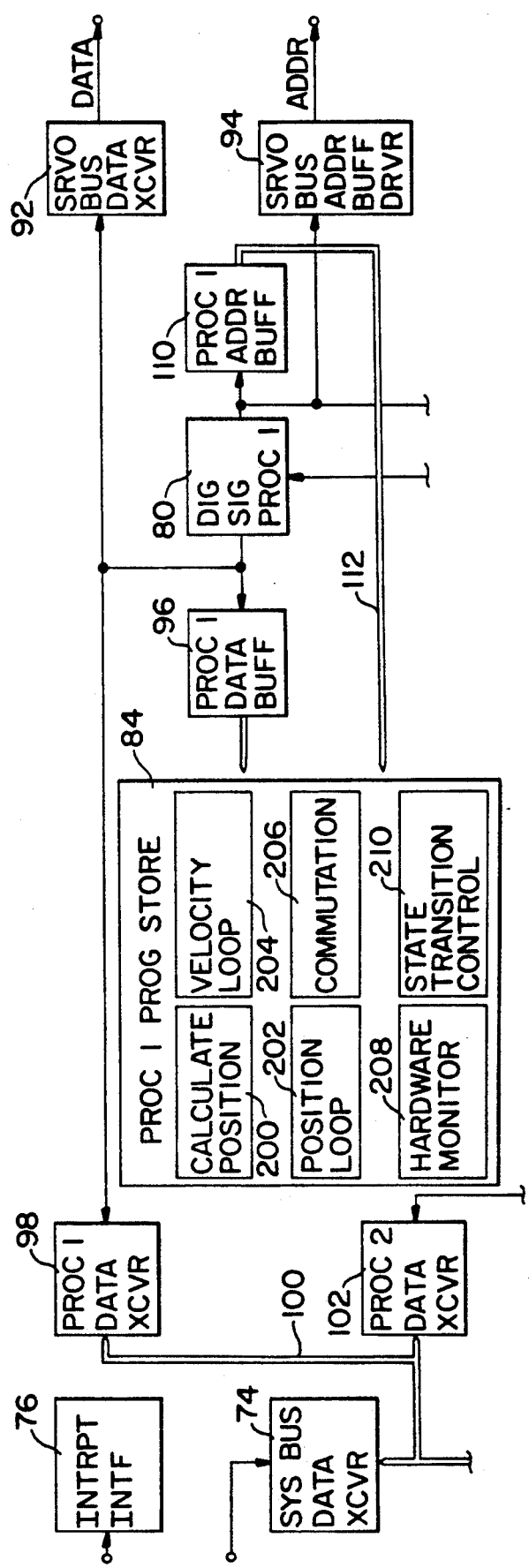
FIG. 3 is a block diagram of the digital signal processing module of the motor control of FIG. 1.
Figure 3:
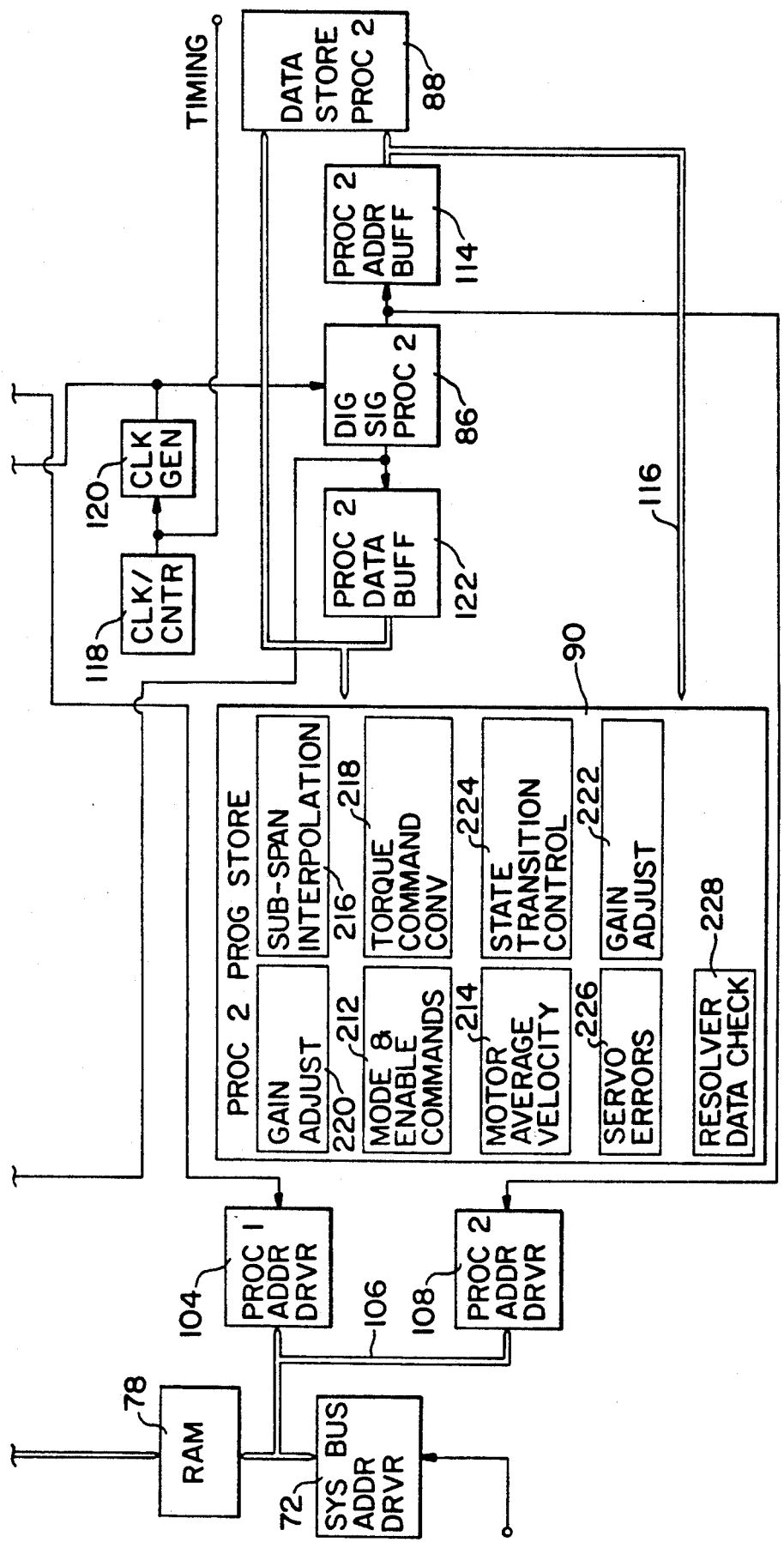

Continuing with reference to FIG. 3, an oscillator and counter 118 produce outputs which are decoded as clock signals by the clock generator 120. These clock signals control the rate of execution of programs by the processors 80 and 86 and define predetermined time intervals assumed in the calculation of current command signals and the sub-intervals of sub-span interpolation.

Signal processing module 20 performs the functions of: interpolating sub-spans of commanded positions within each update interval; calculating measured position from the transducer output data; calculating position error, i.e., the difference between sub-span position commands and measured or actual position; calculating a velocity command in response to position error; and, calculating a current command to control the motor velocity. The signal processing module 20 receives the input position command from the numerical control 10 in feedback units, i.e., the dimensionless units defining the resolution of measured positions. In the preferred embodiment, resolvers are used as position transducers and the rotor relative angular position $\Theta$ is extracted from the resolver output sine and cosine amplitude data using known techniques. Actual position is expressed in the same dimension-less units as used to express the position commands. Digital processing module 20 converts the calculated position difference to a velocity command by multiplying the position error by a position loop gain factor KV. The expression is:

$$VCMD = KV \, (POS \, CMD - POS \, ACT)$$

Where:
VCMD is velocity command
POS CMD is commanded position
POS ACT is actual position The value of the position loop gain factor KV may be supplied from the numerical control 10 from commissioning data store 64 at the time of system initialization. Thereafter, the loop gain factor KV may be adjusted by inputs received from the numerical control 10 by modification of an adjustment value KVADJ. Applicants provide adjustment of the factor KV in accordance with the following algorithm:

$$KVEFF = KVADJ \times KV$$

Where:
KVEFF is the effective value of KV
KVADJ has a range of 0–4

The digital processing module 20 effects velocity control in response to a velocity error VE, i.e., the difference between the velocity command VCMD and the actual instantaneous velocity. In the preferred embodiment, the actual instantaneous velocity is calculated from the measured change of position in the immediately preceding loop closure interval. Velocity control may be effected by either a proportional plus integral control scheme or a pseudo derivative feedback control scheme. Both control techniques are implemented using a compensated value of measured velocity to produce a scaled and compensated actual velocity signal VACT. The value of VACT is calculated to implement velocity feedback compensation having the form:

$$KF[((z+1)(z-ZF1))/((z-PF2)(z-PF3))]$$

Where:
z represents complex frequency in the discrete time domain according to $z = e^{s\delta t}$ in which s represents complex frequency in the continuous time domain and $\delta t$ represents the sample interval
KF = scale factor
PF2 = lead compensator zero frequency
PF3 = filter pole frequency
ZF1 = lead compensator pole frequency Values of the lead compensator zero frequency PF2, the filter pole frequency PF3, and the lead compensator pole frequency ZF1 are supplied by the user and may be stored in commissioning data store 64 for transfer to the motor control 12 upon system initialization. Applicants have chosen to assign values of zero to ZF1 to PF2, thereby simplifying the expression and reducing processing time. A value for the feedback scale factor KF is calculated by signal processing module 20 at an assumed frequency of zero hertz to effect gain matching between the continuous and discrete time domains. The expression is:

$$KF = CF \times (1 - PF2)(1 - PF3)/2 \times (1 - ZF1)$$

Where:
CF = a constant effecting the relationship between feedback scaling and VACT scaling With the simplifying choices of ZF1 and Pf2 assigned values of zero, this expression for KF at the matching frequency of zero hertz becomes:

$$KF = (1 - PF3)/2$$

The calculations to implement the desired scaling and compensation of velocity feedback are:

$$\begin{aligned}VACT = &V_k \times KF + V_{k-1} \times KF \times (1-ZF1) + V_{k-2} \\ &\times (-KF \times ZF1) \\ &+ VACT_{k-1} \times (PF2 + PF3) \\ &+ VACT_{k-2} \times (-PF2 \times PF3)\end{aligned} \qquad (1)$$

Where:
$V_k$ = measured velocity of the k update interval
$V_{k-1}$ = measured velocity of the k−1 update interval
$V_{k-2}$ = measured velocity of the k−2 update interval
$VACT_{k-1}$ = VACT of the k−1 update interval
$VACT_{k-2}$ = VACT of the k−2 update interval With the simplifying choices of KF1 and PF2 equal to zero, equation (1) becomes:

$$VACT = V_k \times KF + V_{k-1} \times KF + VACT_{-1} \times PF3$$

Proportional plus integral velocity control is characterized by a control transfer function having the form:

$$KP \times [(s + KI)/s] \times VE$$

Where:

s represents complex frequency
KP = proportional gain factor
KI = integral gain factor
VE = velocity error
 = VCMD − VACT
Where:
VCMD = velocity command
VACT = actual velocity
(scaled and compensated)

Pseudo derivative feedback velocity control is characterized by a transfer function having the form:

$$KPDF \times [KI/s] \times VE - (KPDF \times VACT)$$

Where:
s represents complex frequency
KPDF is a gain factor equivalent to the velocity gain factor in proportional plus integral control and the other quantities have the same definitions as in the case of proportional plus integral control.

The signal processing module 20 effects the selected type of control using effective values of the gains KI, KP, and KPDF derived from user supplied values which may be transferred to the motor control 12 from the commissioning data store 64. Adjustment of the gain values is accomplished through adjustment parameters PADJ, PDFADJ, and KIADJ in accordance with the following:

$$KP(eff) = PADJ \times KP(nominal)$$

$$KI(eff) = KIADJ \times KI(nominal)$$

$$KPDF(eff) = PDFADJ \times KPDF(nominal)$$

To provide increased velocity loop gain at and near zero velocity, a further gain modification factor KRO is applied in accordance with the following:

$$KP = (1 + KRO)KP(nominal)$$

$$KI = (1 + KRO)KI(nominal)$$

$$KPDF = (1 + KRO)KPDF(nominal)$$

The change of gain during low speed operation is effected at a constant rate over a speed range of from about 10 rpm to about 3 rpm. The value of KRO is a user specified friction compensation multiplier which is input from numerical control 10.

A current command is produced in response to the selected type of control taking into consideration the axis moment of inertia, the motor torque constant and the current scaling associated with the pulse-width modulation control signals to be applied to the power block 16. In addition, a current component produced in response to a direct torque command input is summed with the current command component derived from the velocity loop control algorithm.

The calculations performed to produce the current command implementing proportional plus integral control are:

$$ICMD = IKP \times VE_k + IKI \times I_k + TCMD/KT \quad (2)$$

Where:

$I_k$ = integrator evaluation of the $k$ update interval
   = $VE_k + I_{k-1}$

Where:
$I_{k-1}$ = integrator evaluation of the $k-1$ update interval $IKI$ = internal integral gain
   = $(IKP^*KI^*KIADJ)/C1$ Where:
C1 = constant accounting for conversion of units including conversion of time to time per sample interval and the multiplier of KIADJ KIADJ = integral gain adjust factor $IKP$ = internal proportional gain
   = $[KPADJ^*KRO^*(1 + JADJ)](C2^*KP^*JA)/(KT^*AS)$ Where:
AS = power block current scale factor
C2 = constant accounting for conversion of units and the multiplier of KPADJ
JA = axis moment of inertia adjust factor
JADJ = moment of inertia adjust factor
KPADJ = proportional gain adjust factor
KRO = low speed gain modification factor
KT = motor torque constant (torque/amp)
TCMD = direct torque command
$VE_k$ = VE at the k update interval The calculations performed to produce the current command implementing pseudo derivative feedback control are:

$$ICMD = -IKPDF \times VACT + PKI \times I_k + TCMD/KT \quad (3)$$

Where:

$IKPDF$ = internal pseudo derivative gain factor
   = $[KPDF^*KRO^*(1 + JADJ)]$
   $(C2^*KPDF^*JA)/(KT^*AS)$ $PKI$ = internal integral gain factor
   = $(IKPDF^*KI^*KIADJ)/C1$ and all other components have the definitions stated above.

Values of the axis moment of inertia JA, the torque constant KT, and the current scale factor As may be stored with the commissioning data in the commissioning data store 64 of the numerical control 10. This data can be loaded once to data store 88 through the system data bus 26. The current command signals produced by signal processing module 20 are transferred over the motor controller bus 24 to the interface module 22.

A detailed description of the procedures executed by the processors 80 and 86 to effect position loop and velocity loop control shall be described with reference to FIGS. 5a, 5b, 6a, and 6b. While applicants have chosen to allocate tasks between the processors in the manner to be described, it will be appreciated that other allocations would serve equally as well, the primary consideration being the processing time consumed executing all of the tasks within the loop closure interval.

Figure 5B:
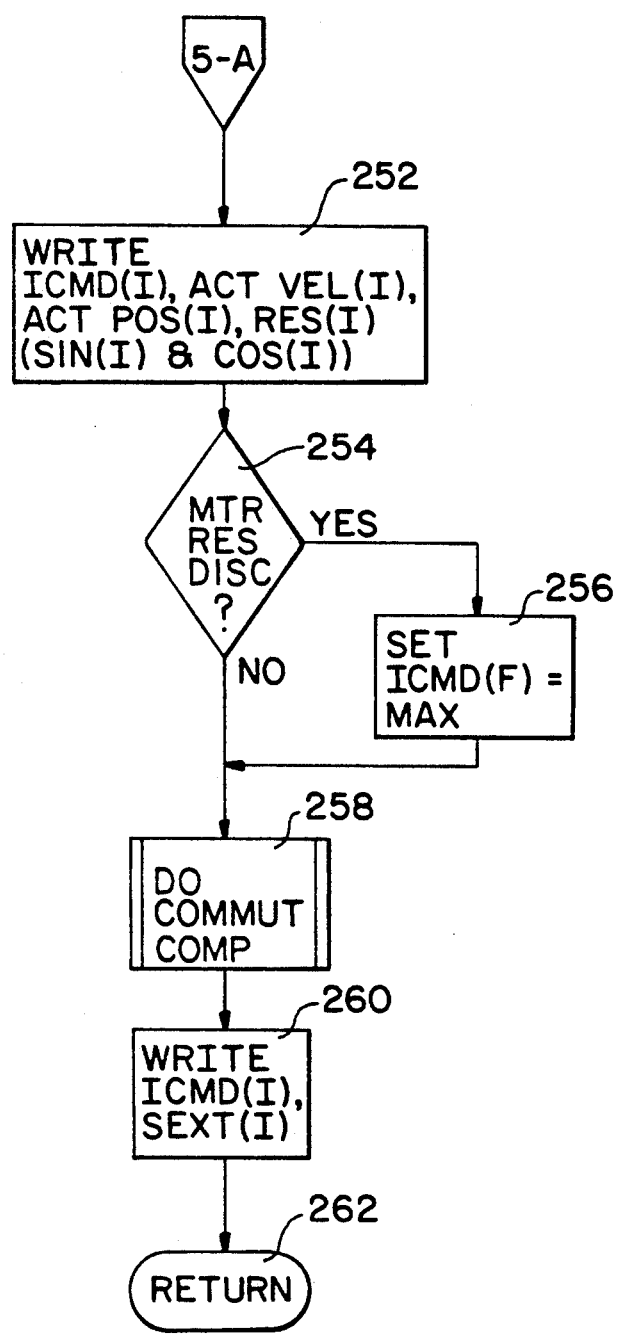

The routines executed by processor 80 are subdivided into background processing illustrated by the flow chart of FIG. 5a and interrupt processing illustrated by the flow chart of FIG. 5b. Background programs are executed in a continuous loop until the occurrence of an interrupt associated with the loop closure interval. Process step 230 effects execution of the hardware monitoring routines 208. These routines examine status flags indicating hardware failures. The flags may be set during initialization or at any time a hardware failure is detected by built-in diagnostic tests during normal operation. Upon completion of the execution of the hardware monitoring routines, processing continues at step 232 where the mode control routines 210 are executed. These procedures control the transition from one mode of operation or state of the signal processing module 20 to another. These routines provide verification of all conditions required to proceed from one control state to another.

Upon occurrence of an interrupt signal associated with the loop closure interval, execution of the procedure illustrated by the flow chart of FIG. 5b is initiated by processor 80. The interrupt procedure begins with execution of the position measurement routines 200. At process step 234 the resolver output signals for all resolvers in use are read from interface module 22. These output signals are stored by the interface module 22 in memory locations which are directly accessible by signal processing module 20. The resolver output signals read by process step 234 are loaded into dedicated locations of memory 78. At process step 236 positions for all axes are calculated as the inverse tangent of the ratio of the resolver output signals. The axis positions are represented by dimensionless units defining the resolution of the measured positions.

Processing of the routines associated with position loop control procedures 202 begins at decision step 238 where it is determined whether or not processor 86 has completed adjustment of the position loop gains $KV_I$ (the subscript I designating an index to identify the individual position loop gain values). If gain adjustment has not been completed, the adjusted gain values are not available for loading in local memory and step 242 is skipped. Assuming that the position loop gain adjustment has been completed, execution of the interrupt procedure continues at process step 242 where the position loop gain values $KVEFF_I$ are loaded to working memory locations for use by processor 80. As in the case of the position measurement routines 200, the position loop processing routines perform the position loop calculations for all the controlled motors. At process step 244 velocity commands are produced by: (a) calculating following errors $FE_I$, i.e., the difference between commanded position $POS\ CMD_I$ and measured position $ACT\ POS_I$; and, (b) multiplying the following errors $FE_I$ by the associated position loop gains $KVEFF_I$. At decision step 246 it is determined whether a hardware fault status has been set true by the background hardware monitoring routines. In the event a fault status has been set for any of the controlled position loops, all velocity commands $VCMD_I$ are set equal to zero at process step 248. This has the effect of preventing the generation of excessive current commands that might result in damage to the motor or the switching transistors.

Execution of the interrupt procedure continues with execution of the velocity loop routines 204 at process step 250. Current commands $ICMD_I$ for all of the controlled motors are generated by execution of the velocity loop routines 204. Instantaneous measured velocity is first calculated from the change of position during the loop closure interval. Measured velocity is compensated in accordance with equation (1) to produce $VACT_I$ for all controlled motors. For motors being controlled in accordance with the proportional plus integral control method, current commands $ICMD_I$ are calculated in accordance with equation (2) and for motors controlled in accordance with the pseudo derivative feedback method velocity commands are computed in accordance with equation (3). At process step 252 values for the commanded current $ICMD_I$, measured velocity $ACT\ VEL_I$, measured position $ACT\ POS_I$ and the transducer output signals $SIN_I$ and $COS_I$ are written to memory 78.

Execution of the interrupt procedure continues with execution of the commutation control anticipation routines 206 beginning at decision step 254. There it is determined whether any of the status flags have been set indicating that a loss of feedback has been detected by interface module 22. In the event a loss of feedback is detected the current command $ICMD_F$ associated with the failed position loop is set equal to a maximum value at process step 256. If no disconnection has been detected new commutation pattern control signals $SEXT_I$ are produced at process step 258. Process step 258 is skipped in connection with any motor for which a loss of feedback has been detected. This has the effect of ceasing commutation of stator coil current for the associated motor while maintaining the applied current at a maximum value to effect magnetic detenting of the motor. The loss of feedback is indicated to the CNC by an output from signal processing module 20 through system bus 26.

A set of commutation pattern control signals is associated with rotor relative position by means of a conversion table using a calculated anticipated rotor position. The rotor position expected to be attained during the next loop closure interval is calculated as the sum of the last read rotor position $\Theta_{I(k-1)}$ and the product of the average relative velocity $VAVG_I$ and the loop closure interval time $\delta t$. For a conventional six-zone motor, rotor position is divided into six equal angular zones or sextants, each zone being associated with a set of commutation pattern control signals from which the conductive state of the stator coils is determined as follows:

| Zone (radians) | Sextant | Sextant Data | | | UVW Conduction | |
|---|---|---|---|---|---|---|
| | | S3 | S2 | S1 | CW | CCW |
| 0-$\pi$/3 | 1 | 0 | 0 | 1 | W to V | V to W |
| $\pi$/3-2$\pi$/3 | 2 | 0 | 1 | 0 | U to V | V to U |
| 2$\pi$/3-$\pi$ | 3 | 0 | 1 | 1 | U to W | W to U |
| $\pi$-4$\pi$/3 | 4 | 1 | 0 | 0 | V to W | W to V |
| 4$\pi$/3-5$\pi$/3 | 5 | 1 | 0 | 1 | V to U | U to V |
| 5$\pi$/3-0 | 6 | 1 | 1 | 0 | W to U | U to W |

Where:
CW = clockwise direction of rotation
CCW = counter-clockwise direction of rotation U, V, and W designate terminals of the stator coil winding network and conduction is defined in the direction of positive toward ground While the loop closure interval is fixed, the interval of change of commutation patterns is a function of velocity. It is therefor necessary to determine the instant within the loop closure interval at which the rotor position is anticipated to traverse a zone boundary. The anticipated time for the rotor relative position to reach the zone boundary is calculated by dividing the distance between the rotor current position and the zone boundary by the measured velocity. The calculated anticipated commutation time is divided by a predetermined loop closure sub-interval chosen to produce an acceptable error between actual and ideal rotor relative position at the instant of commutation at the maximum anticipated velocity. A commutation anticipation time TC is represented by the binary equivalent of the calculated number of loop closure sub-intervals and is included in each commutation pattern control word $SEXT_I$.

Execution of the commutation routines 206 is completed at process step 260 where the current commands ICMD$_I$, and commutation pattern control words SEXT$_J$ including commutation anticipation times TC$_J$ are written to dedicated storage locations for the interface module 22. Following completion of process step 260 interrupt procedure processing ends and processor 80 returns to execution of the background routines through the return of terminal 262.

Figure 6A:
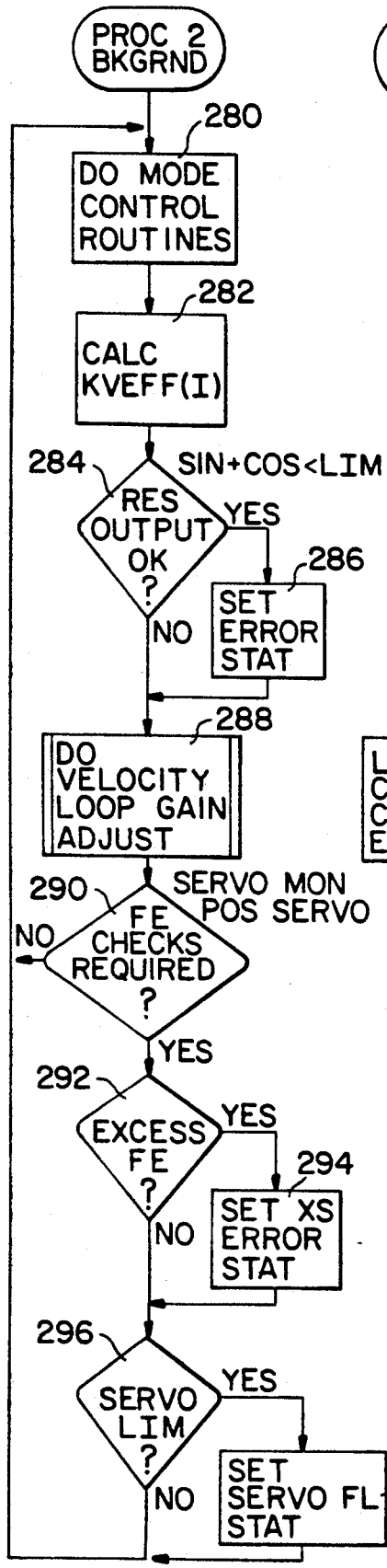
FIGS. 6a and 6b are flow charts illustrating the cycle of operation of a second signal processor of the module of FIG. 3.

Execution of routines allocated to processor 2 shall be described with reference to FIGS. 6a and 6b. A flow chart of the procedure for background processing performed by processor 86 is illustrated in FIG. 6a. At process step 280 mode control routines 224 controlling the transition from state to state of the signal processing module 20 are executed. Process step 282 executes position loop gain adjustment routines 222 to calculate adjusted values of the position loop gains KVEFF$_J$ for each of the motors under position loop control. It will be recalled that decision step 238 of the interrupt procedure for processor 80 detects the completion of the calculation of adjusted position loop gains KVEFF$_J$ by processor 86. A status flag is set upon completion of the calculations associated with process step 282.

Execution of background programs continues with execution of the resolver output data checking routines 228 beginning at decision step 284. A determination is made as to the integrity of the resolver output signals by summing the squares of the sine and cosine values for each position transducer and comparing the sum to a limit value. If the sum is less than the limit value, an error status flag associated with the transducer for which the output data is erroneous is set at process step 286.

Background program execution continues with execution of the velocity loop gain adjust routines at process step 288. Gain values are adjusted by multiplication of the selected gain values by the gain adjust values as previously described. Gain values adjusted with process step 288 include the proportional gains KP$_J$, integral gains KI$_J$, and the pseudo derivative gains KPDF$_J$. The adjusted values are loaded in local memory 78 for access by processor 80 for execution of the velocity loop processing routines 204 previously described.

Background program processing continues with execution of the servo error checking routines 226 beginning at decision step 290. There it is determined whether servo monitoring has been disabled and whether the particular motor being controlled is controlled as a position loop servomechanism or a velocity loop servomechanism. If servo monitoring is disabled steps 292 through 298 are skipped and execution of the background programs continues at process step 280 until the occurrence of an interrupt. Assuming servo monitoring is enabled and that a position loop servo is selected, processing continues at decision step 292 where it is determined whether or not the magnitude of any of the following errors FE$_J$ exceed a first limit value LIM1. The limit value LIM1 is associated with an excessive lag between the commanded position and the measured position and a typical response is to reduce the commanded rate of change of position until the excess error condition is eliminated. Assuming that an excess following error condition is detected by decision step 292, an excess error status flag is set at process step 294. Processing continues at decision step 296 where it is determined if any of the following errors FE$_J$ exceed a second limit value LIM2 associated with a servo failure. A typical response to the detection of following error in excess of the limit value LIM2 is to initiate an emergency stop and thereby remove power from the affected motor. Assuming that a following error magnitude in excess of the limit LIM2 is detected at decision step 296, the error flag associated with the affected motor is set at process step 298. Thereafter execution of the background procedures continue at process step 280 until the occurrence of an interrupt.

Figure 6B:
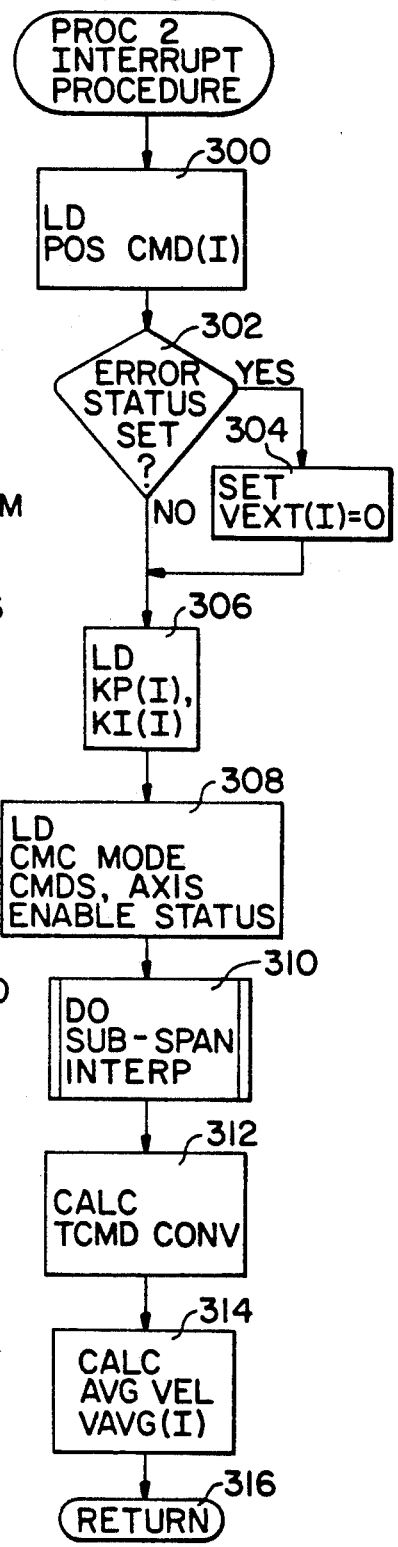

The interrupt signal used to initiate the execution of the interrupt procedure illustrated by the flow chart of FIG. 5a also initiates the execution of the interrupt procedure illustrated by the flow chart of FIG. 6b. It will be understood therefore, that the processing of interrupt procedures by the processors 80 and 86 occurs simultaneously.

Referring to FIG. 6b, process step 300 the position commands POS CMD$_J$ produced by execution of the sub-span interpolation routines 216 to are loaded in local memory from memory 78. Decision step 302 determines whether any of the error status flags have been set by execution of the background routines of FIG. 6a. In the event that decision step 302 detects that an error status flag has been set, the external velocity command VEXT$_J$ for the affected velocity loop is set equal to zero by process step 304. At process step 306 gain values for the velocity loop including proportional gains KP$_J$, integral gains KI and pseudo derivative feedback gains KPDF$_J$ are loaded to immediate memory locations such as, for example, data store 88 in preparation for gain adjustment performed during background program processing. At process step 308 mode command data and axis enable status data from the numerical control are loaded to local memory. These data include the servo type, i.e., velocity or position, and flags indicating which of the controlled motors are enabled. Selection of control loops is effected by the enable commands. Additionally, external velocity commands VEXT$_J$ input by the numerical control are loaded from memory 78 to local storage locations.

Interrupt procedure processing continues with execution of the sub-span interpolation routines 216 at process step 310. Sub-span interpolation effects the reduction of change of position commanded by the numerical control at the update interval into subincrements to be output as position commands POS CMD$_J$ at the loop closure interval. The update interval of the numerical control is effectively subdivided into the loop closure interval of motor control 12 to produce incremental position commands for the position loop servos. For sub-span interpolation along a straight line the algorithm to produce position commands is as follows:

$$POS\ CMD_k = POS\ CMD_{k-1} + S \times (\delta t/UT)$$

Where:
S = change of position at update interval
δt = sub-span interval
UT = update interval
and the subscripts k and k−1 indicate respectively the current and previous values
The newly created position commands POS CMD$_J$ are stored in memory 78 for access by processor 80.

Interrupt procedure processing continues with execution of the torque command conversion routines 218 at process step 312. Torque command conversion effects the conversion from engineering units to current command units using the values for the torque constant KT and the current scale factor AS. Torque commands TCMD$_j$ are stored in memory 78 for access by processor 80.

Processing of the interrupt procedure proceeds with execution of the average velocity calculation routines 214 at process step 314. Motor average velocity is calculated for each motor under control as the average change of rotor position over a predetermined number of loop closure intervals as follows:

$$VAVG = (\Theta_k - \Theta_{k-n})/p$$

Where:
 $\Theta$ = rotor relative position
 p = the number of loop closure intervals used for averaging
 and k and k-n designate values for respectively the current and the $p^{th}$ previous loop closure intervals
Average velocities VAVG$_j$ are stored in memory 78 for access by processor 80 which uses the average velocity values in connection with execution of the commutation anticipation routines 206. Upon completion of the calculation of average actual motor velocity, execution of the background programs is continued by return through terminal 316.

To facilitate an explanation of the operation of the interface module 22, a description of the connection of the motor stator windings to the power source via the switching transistors shall be provided with reference to the power block module 16.

POWER BLOCK MODULE

Figure 7:
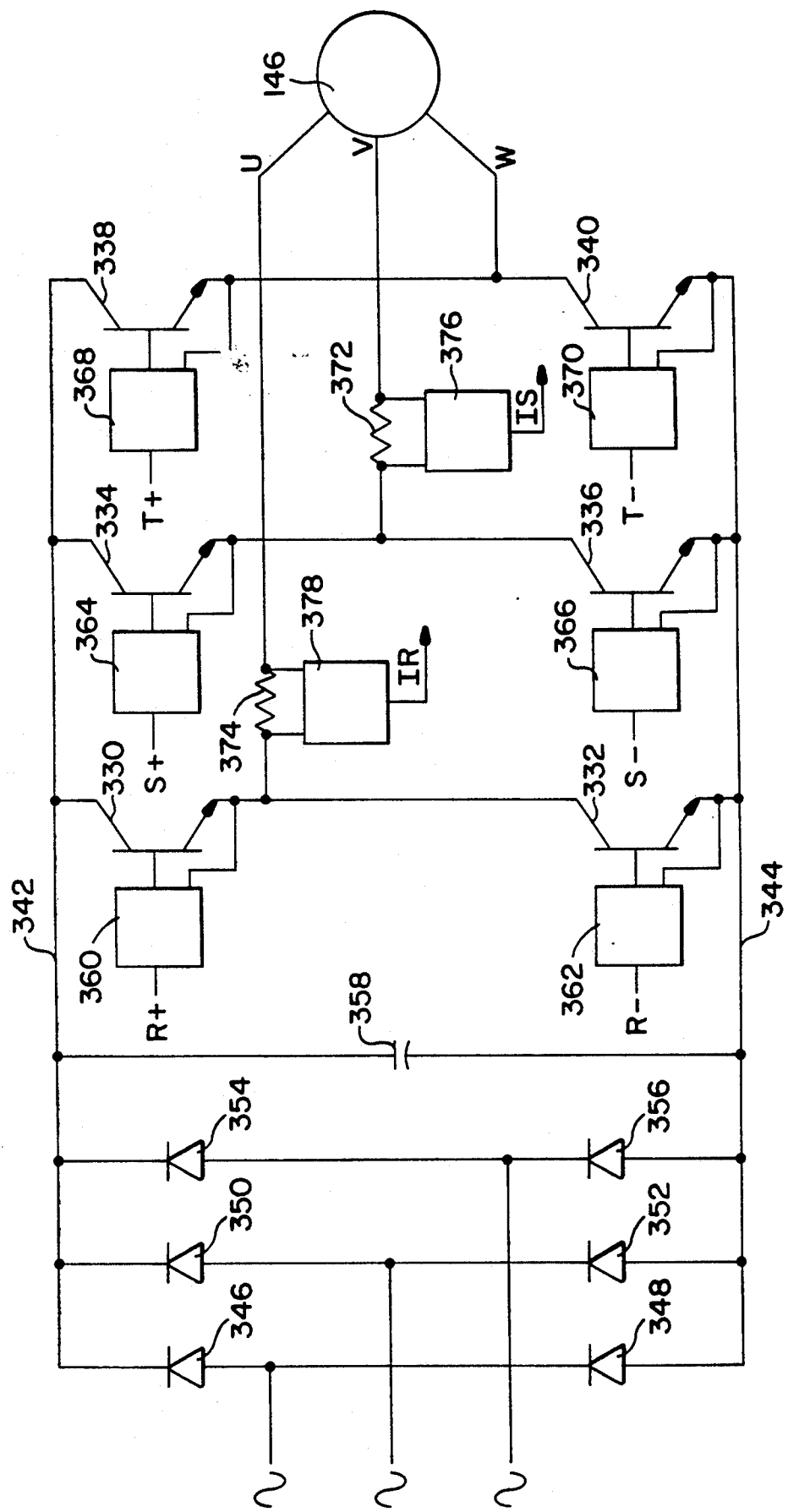
FIG. 7 is a circuit diagram of the switching transistor connections of the power block module of FIG. 1.

A detailed description of the circuitry used for applying power to the stator coils of the controlled motors shall be given with reference to FIG. 7. A brushless DC motor such as motor 138 includes a network of three distributed stator windings connected in, for example, a conventional wye configuration to terminals U, V, and W. Current may be conducted through a desired combination of the stator windings by providing a current path between a DC power supply and the appropriate combination of the terminals U, V, and W. The desired combination is determined from the sextant data contained in the commutation pattern control words SEXT$_j$.

As is conventional, power may be derived from a source of three phase AC current which is rectified and filtered. In the preferred embodiment, three phase power is rectified by the network of diodes 346 through 356 and filtered by capacitor 358 to produce a DC voltage having a positive polarity at line 342. A DC current return is provided by line 344 (the lines 342 and 344 are referred to collectively as the power rails of the power block module 16).

Current is applied to the motor terminals through a network of switching transistors 330 through 340. Transistor pairs 330 and 332; 334 and 336; and, 338 and 340 provide source and return switches for, respectively terminals U, V, and W of motor 138. It will be appreciated that for each transistor pair, it is intended that only one transistor be conducting at any time to provide a path for DC current between, alternatively, the lines 342 and 344, and the motor terminal. Each transistor is switched between its conducting and nonconducting conditions by means of conventional isolation circuits 360 through 370 providing signal isolation between low level control signals and the currents switched. Applicants have chosen isolation circuits including optical couplers and base drive circuitry for the switching transistors.

Control of current in the stator windings is achieved by pulse width modulation of current conducted by the switching transistors. Pulse width modulation is effected in response to the current commands ICMD$_j$ and measured stator currents derived from current sampling shunt resistors 372 and 374. These resistors produce voltages representative of the magnitude of current through the stator windings. Interface circuits 376 and 378 convert the amplitude analogue representation of motor current appearing across shunt resistors 372 and 374, respectively, to pulse width modulated representations and provide transformer isolation for transferring the measured motor current signals in pulse width modulated form to the interface module 22. The frequency of pulse-width modulation of the current feedback signals is such that the modulation does not introduce significant time lag into the presentation of motor current. The instantaneous states of the switching transistor control signals is determined by the sextant data of the commutation pattern control word signals SEXT$_j$ and pulse width modulation control signals generated to maintain a desired stator winding current. The control signals are generated in pairs designated by R+, R−; S+, S−; and, T+, T− and have a delay period introduced to allow for the transition time between conducting and nonconducting states of the switching transistors 330 through 340. The generation of the control signals R+, R−, S+, S−, T+, and T− shall be described in greater detail in conjunction with the following description of the interface module 22.

INTERFACE MODULE

A detailed description of the interface module 22 shall be had with reference to FIG. 4. As has been previously stated, the interface module 22 provides the interface for signals between the position transducers and power block 16 and the signal processing module 20. Data exchanged over the controller bus 24 passes through the data transceiver 124 to local bus 126. Data is exchanged through the dual port memory 128. Dual port memory 128 is addressed directly from the signal processing module 20 on address bus 130 and from local address bus 131.

The interface module 22 provides signal interfacing for up to four motors and associated position transducers. In the preferred embodiment position transducers 132, 134, 136 and 138 are resolvers directly measuring the relative position of the rotor and stator for each motor 140, 142, 144 and 146. A resolver drive control 148 produces the required excitation signal, i.e., an AC signal impressed on the resolver rotor windings. Resolver interface 150 receives the output signals from the resolver stators. The resolver output signals are input to the analog multiplexer and switching circuitry 152 from which selected analog signals are input to the analog-to-digital converter 154. Digital representations of the resolver output sine and cosine amplitudes are available at the output of the analog-to-digital converter 154 and are transferred over bus 156 to the dual port memory 128 for access by the signal processing module 20. In addition to the position transducers 132 through 138 illustrated in FIG. 4, the interface module 22 provides excitation signals and interfaces for up to two additional resolvers for each of the four axes of motion associated with the motors 140 through 146. These additional resolvers may be driven directly by the motors or may be driven by motion of the machine moveable members to measure positions thereof.

Interface module 22 produces pulse-width modulated control signals for the commutation switching transistors in power block 16. The states of control signals for the switching transistors of power block 16 are controlled by logic cell arrays 160 and 162 according to the commutation demanded by the commanded motor velocity. Each of the logic cell arrays 160 and 162 is associated with two of the motors 140 through 146. The switching transistor control signals are output by power block input/output interface 158.

Current control for each of the motors 140 through 146, defining the pulse width of the switching transistor control signals, is accomplished by means of analog loop processors 164 through 170. Further details of these processors shall be described hereinafter. Each analog loop processor produces a positive and negative pulse-width modulated control signal in response to signals representing measured motor current and a current command.

The current commands used by the loop processors 164 through 170 are analogue forms of the current commands produced by signal processing module 20. These current command signals are available in dual port memory 128 in digital form and are recalled therefrom one-by-one and loaded into data latch 172 as an input to digital to analogue converter 174. An amplitude analogue representation of the current command produced by converter 174 is periodically sampled and held by the analogue loop processors 164 through 170.

Measured motor current as used by the loop processors 164 through 170 is derived from the shunt resistors 372 and 374 described in connection with the power block module 16. Although motor current may be monitored for each of the three terminals of motor stator windings, it is sufficient to monitor only two, and infer the third. Power block input/output interface 158 provides circuitry to receive the high frequency pulse width modulated representation of motor current and convert these signals to low level DC signals compatible with the logic cell arrays. The low level signals are input to the logic cell arrays 160 and 162 and the selected measured current is gated therefrom in pulse-width modulated form to the appropriate ones of the analog loop processors 164 through 170 in accordance with the active rotor position as represented by the sextant data of each commutation pattern control word SEXT$_I$.

The current command, current feedback and current error signals from each of the analog loop processors 164 through 170 are input to the analogue multiplexer and switches 152. Digital representations of these analogue outputs are produced by analogue-to-digital converter 154. These digital representations are available to the signal processing module 20 at the dual port memory 128.

The logic cell arrays 160 and 162 associate the sextant data of the commutation pattern control words SEXT$_I$ and the pulse-width modulated command signals with the appropriate transistor switches of power block 16 to produce control signals therefor. The Boolean expressions relating the transistor switch control signals, the sextant data, and the pulse width modulated control signals are as follows:

R+ = MODCW AND [(S3 \ S2S1 \ ) OR (S3 \ S2S1)]OR MODCCW AND [(S3S2 \ S1) OR (S3S2S1 \ )]

R− = MODCW \ AND [(S3 \ S2S1 \ ) OR (S3S2S1)]OR MODCCW AND [(S3S2 \ S1) OR (S3S2S1 \ )]

S+ = MODCW AND [(S3S2 \ S1) OR (S3 \ S2S1)]OR MODCCW AND [(S3 \ S2 \ S1) OR (S3 \ S2S1 \ )]

S− = MODCW \ AND [(S3S2 \ S1 \ ) OR (S3S2 \ S1)]OR MODCCW AND [(S3 \ S2 \ S1) OR (S3 \ S2S1 \ )]

T+ = MODCW AND [(S3 \ S2 \ S1) OR (S3S2S1 \ )]OR MODCCW AND [(S3 \ S2S1) OR (S3S2 \ S1 \ )]

T− = MODCW \ AND [(S3 \ S2 \ S1) OR (S3S2S1 \ )]OR MODCCW AND [(S3 \ S2S1) OR (S3S2 \ S1 \ )]

Where:
MODCW = pulse width modulated control signal with leading edge delay producing clockwise rotation
MODCW \ = inversion of MODCW with leading edge delay
MODCCW = pulse width modulated control signal with leading edge delay producing counter clockwise rotation
MODCCW \ = inversion of MODCCW with leading edge delay
S1 = sextant data 1
S1 \ = inversion of S1
S2 = sextant data 2
S2 \ = inversion of S2
S3 = sextant data 3
S3 \ = inversion of S3

The logic cell arrays decode the sextant data and gate the results with the pulse width modulated control signals to produce the transistor control signals. These control signals are output by the logic cell arrays 160 and 162 to the power block input output interface 158 and applied to the switching transistors of power block 16.

The delay required to accommodate the transistor turn-off delay noted in connection with the description of the circuitry of power block module 16 is effected at the logic cell arrays. Counters are employed to measure selectable predetermined intervals beginning with the occurrence of a leading edge of the pulse width modulation signals. The duration of the delay is selectable between two values, the selection being controlled by signals produced by the processor module in response to user choices stored as commissioning data. The delay selection signals effect gating of predetermined timing signals with the pulse width modulation signals at the leading edges thereof.

The position transducer outputs are periodically sampled at a rate referred to herein as the loop closure rate defining a predetermined time interval referred to as the loop closure interval. In applicant's preferred embodiment the loop closure interval is 500 microseconds. It will be appreciated that the rotor relative position may be such that stator coil commutation must occur during the loop closure interval. Therefore, as previously described, a commutation anticipation time TC$_I$ is included with each sextant word SEXT$_I$ to determine the instant of commutation during a loop closure interval. A time based counter signal produced by counter circuitry 118 of the signal processing module 20 is compared by the logic cell arrays 160 and 162 with the anticipated commutation time to detect the instant of commutation. The logic cell arrays latch the sextant data of the sextant word in active sextant data stores within the arrays at the instant of commutation.

Control of the sequence of events performed by interface module 22 is accomplished by continuous sequential generation of addresses for a read only memory included in sequence control 178. The data retrieved from the read only memory is decoded to produce signals controlling: transfer of data to and from dual port memory 128; conversion of signals by analogue to digital converter 154; latching of digital data at latch 172 for digital to analogue converter 174; selection of analogue signals at analogue multiplexer 152; and, writing of sextant words SEXT$_I$ to the logic cell arrays 160 and 162.

Figure 8:
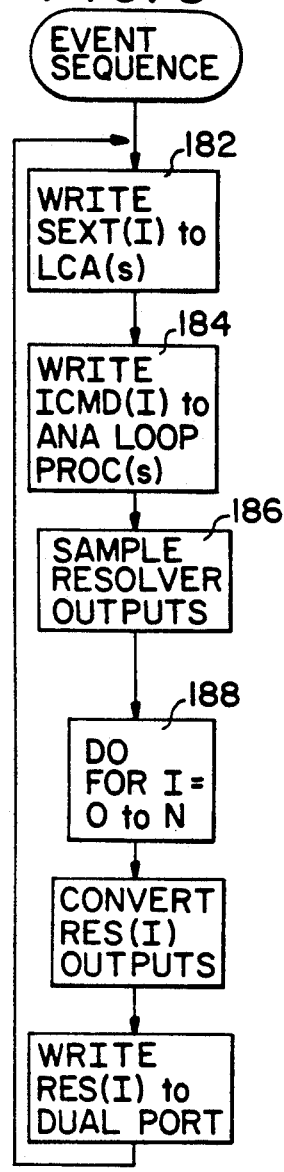
FIG. 8 is a flow chart representing the sequence of functions performed by the interface module of FIG. 4.

The flow chart of FIG. 8 represents the sequence of events performed by interface module under sequence control during the loop closure interval. At event step 182 sextant words SEXT$_I$ are written to the logic cell arrays from dual port memory 128. At event step 184 current commands ICMD$_I$ are read from dual port memory, converted to an amplitude analogue representation at digital to analogue converter 174, and sampled and held at analogue loop processors 164 through 170. At event step 186 the resolver output signals are sampled and held on sample and hold circuits included in resolver interface 150. At event step 188 the resolver output signals are converted to digital representations and the digital representations are written to dual port memory 128 for each resolver in turn. The resolver sampling control signals are synchronized with the resolver excitation signals by sequence control 178. During normal operation, the event steps are continuously repeated as represented by the loop from event step 188 to event step 182.

ANALOGUE LOOP PROCESSORS

Each analogue loop processor produces a current error signal by comparison of the measured current with the commanded current. To effect this comparison, the pulse-width modulated form of the measured motor current is first demodulated to an amplitude analogue thereof. The current error amplifier portion of each analogue loop processor implements a proportional plus integral transfer function. Selection of an integrator time constant and proportional gain factor is accomplished by data input via local data bus 126. The resultant error signal is voltage compensated to account for the "dead band" produced in the switch control signals to prevent shunting of the power module rails as previously described in connection with power block module 16.

To produce the desired positive and negative pulse-width modulated control signals, each analogue loop processor compares the compensated current error signal to two anti-phase triangle wave signals produced by free running triangle wave generator 176. The resulting pulse-width modulated control signals are input to logic cell arrays 160 and 162 where, in accordance with the sextant data of the commutation pattern control words SEXT$_I$, the appropriate switch command signals are produced for the commutation of the motor stator windings.

Figure 9:
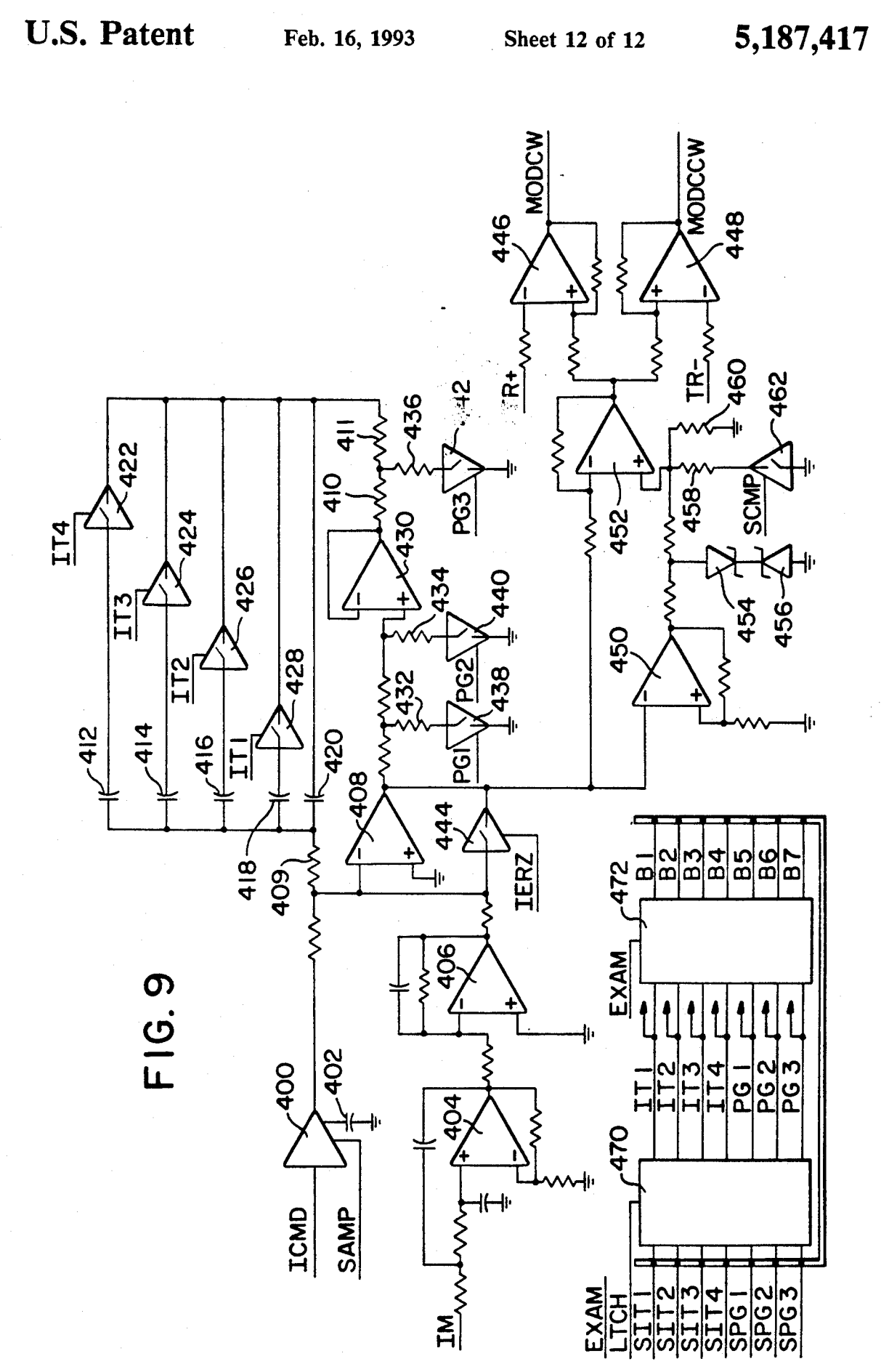

A detailed description of the analogue loop processors shall be given with reference to FIG. 9. Control signals for analogue switches used to effect selections of gain and time constant values associated with the current loop error amplifier are latched in data latch 470. The contents of latch 470 may be examined at the input terminals of each loop processor module through buffer 472. Data is entered into latch 470 and verified under control of signals generated by signal processor 20.

Continuing with reference to FIG. 9, an analogue representation of commanded current is sampled and held by operational amplifier 400 arranged as a sample and hold circuit with holding capacitor 402. The hold control signal for each current sample and hold is produced by sequence control 178 at a predetermined interval as previously described. Pulse width modulated motor current is demodulated to an amplitude analogue representation by operational amplifiers 404 and 406 arranged as a level shifter and three pole Butterworth filter. The low level DC pulse width modulated representation of measured motor current is thereby converted to an AC amplitude analogue representation.

A current error signal is produced so as to implement a proportional plus integral transfer function. The demodulated measured motor current is summed with the current command sample at the input of operational amplifier 408 which serves as an integrator. A fixed capacitance providing a base time constant is provided by capacitor 420. To permit program modification of the integrator time constant, capacitors 412, 414, 416, and 418 are made selectably connectable by analogue switches 422, 424, 426, and 428, respectively. Switches 422 through 428 are controlled by signals produced by processor module 20 in response to user selections stored as commissioning data. A base proportional gain is determined by resistors 409, 410, and 411. Operational amplifier 430 in combination with selectably connectable resistances 432, 434, and 436 provide selectable proportional gains. Analogue switches 438, 440, and 442 connect the resistors 432, 434, and 436, respectively, to ground to achieve the selected proportional gain value. The control signals for switches 438, 440, and 442 are produced by processor module 20 in response to user selections stored as commissioning data. In the event of a failure and during initialization, analogue switch 444 will be closed in response to an enable signal produced by processor module 20 forcing the current error output to zero.

Pulse width modulation signals are produced by comparing the amplitude analogue representation of current error with anti-phase triangle waveform signals produced by triangle wave generator 176. Comparators 446 and 448 perform the comparisons between the triangle waves and the current error signal.

As previously stated, to avoid a potential shunt between the power rails of power block module 16, it is desirable to delay turn-on of the "OFF" transistor in each transistor pair to permit the "ON" transistor to cease conducting. The desired delay appears in the motor current as a "dead band" for which compensation is provided in the current error signal prior to generation of the pulse width modulation control signals. A compensating voltage is added to the current error signal to compensate for the discontinuity associated with the "dead band". The magnitude of this voltage, in accordance with the selectability of the duration of the delay, is selectable between two predetermined values by user selection stored as commissioning data. Operational amplifier 450 compares the current error signal to ground and the result is applied to oppositely poled zener diodes 454 and 456. These diodes clamp the amplifier output to the reverse voltage of the reverse biased zener diode and the forward voltage of the forward biased zener diode. This voltage is applied to a voltage dividing network including series resistances 464, 458 and 462. To enable selection of the magnitude of the added voltage, resistor 458 is selectably connectable in parallel with resistor 460 by means of analogue switch 462. The control signal for switch 462 is produce by signal processing module 20 in response to a user selection stored as commissioning data. The resultant voltage at the junction of resistances 464 and 460 is summed with the error signal at operational amplifier 452. The effect of the compensating circuitry is to add or subtract a compensating voltage when the current error passes through the "dead band".

While the preferred embodiment has been described in considerable detail with reference to the accompanying drawings, there is no intention to limit the invention to detail. On the contrary, it is intended that the scope of the invention be considered to include all modifications, alterations and equivalents falling within the spirit and scope of the appended claims.

What is claimed is:

1. A method for controlling a brushless DC motor having a plurality of field coils fixed to a motor stator, a rotor rotatable relative to the stator and a position transducer for producing measured position signals representing the relative angular position of the motor rotor and motor stator, the method comprising the steps of:
   a. periodically producing a velocity command signal representing a desired relative angular velocity of the motor rotor and motor stator;
   b. periodically producing an actual velocity signal in response to the measured position signals, the actual velocity signals representing a measured rate of change of position of the motor rotor relative to the motor stator;
   c. periodically producing in response to the velocity command signals and the actual velocity signals, at a loop closure rate defining a predetermined time interval invariant with velocity, current command signals representing a desired motor current;
   d. periodically producing in response to the measured position signals and the actual velocity signals, at the loop closure rate, current commutation pattern control signals defining a pattern of conduction through the field coils and representing the instant, relative to a loop closure interval, when a change of commutation patterns is to be effected;
   e. periodically producing switch control signals in response to the current command signals, the commutation pattern control signals, and measured motor current; and
   f. controlling current delivered to the motor field coils in response to the switch control signals.

2. The method of claim 1 wherein the step of producing current command signals further comprises the steps of:
   a. producing a velocity error signal representing a difference between a desired motor angular velocity and the actual motor angular velocity; and
   b. producing the current command signals in response to the velocity error signal and a transfer function relating motor velocity and a motor torque constant.

3. The method of claim 2 wherein the step of producing a velocity error signal further comprises the steps of:
   a. producing a compensated velocity feedback signal representing the actual motor angular velocity signal in response to the change of rotor angular position during the loop closure interval and a digital filter transfer function; and
   b. calculating the difference between the compensated velocity feedback signal and the velocity command signal during the loop closure interval.

4. The method of claim 3 wherein the velocity command signal is produced in response, selectively, to: an input signal representing the desired velocity; and, an input signal representing a desired relative position of the rotor and stator, and an input signal determining the selection to be made.

5. The method of claim 2 wherein the step of producing current command signals further comprises the steps of:
   a. selecting a transfer function in response to an input signal identifying a selected transfer function type for producing the current command signals, the transfer function types including a proportional plus integral transfer function and a pseudo derivative feedback type transfer function;
   b. calculating a current command value in response to a proportional plus integral transfer function in response to that type being selected; and
   c. calculating a current command value in response to a pseudo derivative feedback transfer function in response to that type being selected.

6. The method of claim 1 wherein the step of producing the switch control signals further comprises the steps of:
   a. producing pulse-width modulation signals in response to the current command signals and the measured motor current, the pulse-width modulation signals determining the magnitude of motor current; and,
   b. combining the commutation pattern control signals and the pulse-width modulation signals to produce the switch control signals.

7. A method for controlling a brushless DC motor having a plurality of field coils fixed to a motor stator, a rotor rotatable relative to the stator and a position transducer for measuring the relative angular position of the motor rotor and motor stator, the method comprising the steps of:
   a. storing input signals defining: gain factors associated with a velocity loop transfer function; the motor torque constant; and, the moment of inertia of the motor and its associated mechanical load and adjust signals representing factors by which selected input signal values are to be modified;
   b. periodically producing velocity command signals defining a desired relative velocity of the motor rotor and motor stator;
   c. periodically producing in response to the stored input signals, the velocity command signals and measured motor rotor angular position, at a loop closure rate defining a predetermined time interval, current command signals representing a desired motor current and current commutation pattern control signals representing a desired pattern of excitation of the field coils;
   producing switch control signals in response to the current command signals, the commutation pattern control signals and measured motor current; and
   e. controlling current delivered to the motor field coils in response to the control signals.

8. The method of claim 7 wherein the adjust signals include gain adjust signals for modifying the gain factors of the velocity loop transfer function and moment of inertia adjust signals for modifying the effective value of the moment of inertia of the motor and its associated load and the step of producing current command signals includes the step of modifying the values of the stored input signals in accordance with the adjust signals.

9. The method of claim 8 wherein the current command signals are produced selectively in response to first and second velocity loop transfer functions.

10. The method of claim 9 wherein the first transfer function defines control of the proportional plus integral type and the second transfer function defines control of the pseudo derivative feedback type and the stored input signals representing gain factors include an integral gain factor, a proportional gain factor, and a pseudo derivative feedback gain factor.

11. The method of claim 7 further comprising the step of producing a commutation anticipation signal in response to the measured rotor relative position and average actual rotor relative velocity, the commutation anticipation signal representing the instant during the predetermined time interval when commutation is to occur.

12. The method of claim 11 wherein the step of producing the switch control signals further comprises the steps of:
 a. producing pulse width modulation control signals in response to the current command signals and measured motor current, the pulse-width modulation control signals determining the magnitude of motor current during the predetermined time interval;
 b. loading the commutation pattern control signals to active storage in response to the commutation anticipation signal; and
 c. combining the commutation pattern control signals and storage the pulse-width modulation signals to produce the switch control signals.

13. The method of claim 12 wherein the step of producing the pulse-width modulation control signals further comprises the steps of:
 a. selecting a proportional gain factor for current error amplification in response to a current gain factor select signal; and
 b. selecting an integral time constant for current error amplification in response to a current amplification time constant select signal.

14. The method of claim 13 wherein the current gain factor select signal and current amplification time constant select signal are stored during the step of storing input signals.

15. A method for controlling a brushless DC motor driving a machine member, the motor having a plurality of field coils arranged in a stator, and a rotor rotatable relative to the stator, and a transducer for producing an actual position signal representing the actual relative position of the rotor and stator, the method comprising the steps of:
 a. periodically storing position command signals representing a desired position of the motor rotor relative to the motor stator;
 b. storing input signals defining gain factors of a velocity loop transfer function, parameters of velocity feedback compensation, a motor torque constant and the moment of inertia of the motor with associated mechanical load;
 c. periodically producing:
  (1) in response to the actual position signal, a velocity signal representing the rate of change of position of the rotor relative to the stator;
  (2) in response to the actual position signal and the velocity signal, commutation pattern control signals defining a pattern of field coils to be energized in a predetermined period;
  (3) in response to the actual position signal and the position command signal, a position error signal representing the difference between a desired position and the actual relative position of the rotor and stator;
  (4) in response to the position error signal, a velocity command signal;
  (5) in response to the velocity command signal and the velocity signal, a current command signal;
 d. periodically producing switch control signals in response to the current command signal, measured motor current, and the commutation pattern control signals; and,
 e. controlling the current through the field coils in response to the switch control signals to control the relative position of the motor rotor and motor stator in accordance with the position command signals.

16. The method of claim 15 wherein the step of producing current command signals further comprises calculating a desired motor current value in response to the stored input signals, the velocity command signal, the velocity signal and a predetermined velocity loop transfer function, the calculated motor current value being the value required to produce the velocity represented by the velocity command signal.

17. The method of claim 16 wherein the velocity loop transfer function defines control of the proportional plus integral type and the stored input signals representing gain factors include an integral gain factor and a proportional gain factor.

18. The method of claim 16 wherein the transfer function defines control of the pseudo derivative feedback type and the stored input signals representing gain factors include an integral gain factor and a pseudo derivative feedback gain factor.

19. The method of claim 18 wherein adjust signals representing factors by which selected stored input signal values are to be modified are stored with the input signals and the current commands are produced in response to input signal values determined in accordance with the adjust signals.

20. The method of claim 15 further comprising the step of periodically producing a commutation anticipation signal defining an instant during the predetermined period when commutation is to occur.

21. The method of claim 20 wherein the step of producing switch control signals comprises the steps of:
 a. producing pulse-width modulation control signals in response to the current command signals and measured motor current, the pulse-width modulation control signals determining the magnitude of motor current;
 b. storing the commutation pattern control signals in active storage in response to the commutation anticipation signal; and
 c. combining the commutation pattern control signals in active storage and the pulse-width modulation signals to produce the switch control signals.

22. An apparatus for controlling a brushless DC motor having a plurality of field coils fixed to a motor stator, a rotor rotatable relative to the stator and a position transducer for producing measured position signals representing the relative angular position of the motor rotor and motor stator, the apparatus comprising:

a. digital signal processing means for periodically producing, at a loop closure rate defining a predetermined time interval invariant with motor velocity, current command signals representing a desired motor current and current commutation pattern control signals defining a pattern of conduction through the field coils and representing the instant, relative to a loop closure interval, when a change of commutation patterns is to be effected, the digital signal processing means periodically determining the rate of change of position of the motor rotor relative to the motor stator in response to the measured position signals and producing the current command signals in response to a desired rotor velocity and a measured rotor velocity and producing the commutation pattern control signals in response to the measured rotor velocity and the measured rotor position signals;

b. means responsive to the current command signals, the commutation pattern control signals, and measured motor current for producing switch control signals; and c. switch means responsive to the switch control signals for controlling current delivered to the motor field coils.

23. The apparatus of claim 22 wherein the digital signal processing means further comprises;

a. means for producing a velocity error signal representing a difference between a desired motor angular velocity and the actual motor angular velocity; and b. means for producing the current command signals in response to the velocity error signal and a transfer function relating motor velocity and a motor torque constant.

24. The apparatus of claim 23 wherein the means for producing a velocity error signal further comprises:

a. means for producing a compensated velocity feedback signal representing the actual motor angular velocity signal in response to the change of rotor angular position during the loop closure interval and a digital filter transfer function; and b. means for calculating the difference between the compensated velocity feedback signal and a desired velocity signal representing the desired motor angular velocity during the loop closure interval.

25. The apparatus of claim 24 further comprising means for producing the desired velocity signal in response, selectively, to: an input signal representing the desired velocity; and, an input signal representing a desired relative position of the rotor and stator, and an input signal determining the selection to be made.

26. The apparatus of claim 23 wherein the means for producing current command signals further comprises:

a. means for calculating a current command value in response to a transfer function of the proportional plus integral type;

b. means for calculating a current command value in response to a transfer function of the pseudo derivative feedback type; and, c. means responsive to an input signal identifying a selected transfer function type for producing the current command signals in response to selectively the proportional plus integral transfer function and the pseudo derivative feedback transfer function.

27. The apparatus of claim 22 wherein the switch control signal producing means further comprises:

a. means responsive to the current command signals and the measured motor current for producing pulse-width modulation signals for controlling the magnitude of motor current; and, b. means responsive to the commutation control signals, and the pulse-width modulation signals for producing the switch control signals.

28. The apparatus of claim 27 wherein the pulse-width modulation signal producing means includes a current error amplifier providing a proportional-plus-integral transfer characteristic and the apparatus further comprises:

a. means for selecting a proportional gain factor for the current error amplifier; and b. means for selecting an integral time constant for the current error amplifier.

29. An apparatus for controlling a brushless DC motor having a plurality of field coils fixed to a motor stator, a rotor rotatable relative to the stator and a position transducer for measuring the relative angular position of the motor rotor and motor stator, the apparatus comprising:

a. means for storing input signals defining: gain factors associated with a velocity loop transfer function; the motor torque constant; and, the moment of inertia of the motor and its associated mechanical load;

b. a digital signal processing means responsive to the stored input signals and measured motor rotor angular position for periodically producing, at a loop closure rate defining a predetermined time interval, current command signals representing a desired motor current and current commutation pattern control signals representing a desired pattern of excitation of the field coils;

c. means responsive to the current command signals, the commutation pattern control signals, and measured motor current for producing switch control signals; and d. switch means responsive to the switch control signals for controlling current delivered to the motor field coils.

30. The apparatus of claim 29 wherein the storing means further comprises means for storing adjust signals representing factors by which selected stored input signal values are to be modified.

31. The apparatus of claim 30 wherein the adjust signals include gain adjust signals for modifying the gain factors of the velocity loop transfer function and moment of inertia adjust signals for modifying the effective value of the moment of inertia of the motor and its associated load used to produce the switch control signals and the digital signal processing means uses modified values of the gain factors and the moment of inertia to produce the current command signals.

32. The apparatus of claim 31 wherein the digital signal processing means further comprises means for producing current command signals in response to selectively first and second velocity loop transfer functions.

33. The apparatus of claim 32 wherein the first transfer function defines control of the proportional plus integral type and the second transfer function defines control of the pseudo derivative feedback type and the stored input signals representing gain factors include an integral gain factor, a proportional gain factor, and a pseudo derivative feedback gain factor.

34. The apparatus of claim 29 wherein the digital signal processing means produces a commutation anticipation signal in response to the measured rotor relative position and average actual rotor relative velocity, the commutation anticipation signal representing the instant during the predetermined time interval when commutation is to occur.

35. The apparatus of claim 34 wherein the switch control signal producing means further comprises:
 a. means responsive to the current command signals and the measured motor current for producing pulse-width modulation signals for controlling the magnitude of motor current; and,
 b. means responsive to the commutation anticipation signal, the commutation pattern control signals, and the pulse-width modulation signals for producing the switch control signals.

36. The apparatus of claim 35 wherein the pulse-width modulation signal producing means includes a current error amplifier providing a proportional-plus-integral transfer characteristic and the apparatus further comprises:
 a. means for selecting a proportional gain factor for the current error amplifier; and
 b. means for selecting an integral time constant for the current error amplifier.

37. The apparatus of claim 36 wherein the storing means further comprises means for storing input signals defining a selection of proportional gain for the current error amplifier and a selection of an integral time constant of the error amplifier.

38. An apparatus for controlling a brushless DC motor driving a machine member, the motor having a plurality of field coils arranged in a stator and a rotor rotatable relative to the stator and a transducer for producing an actual position signal representing the actual relative position of the rotor and stator, the apparatus comprising:
 a. means for storing a position command signal representing a desired position of the motor rotor relative to the motor stator;
 b. processing means for:
   (1) periodically producing, in response to the actual position signal, a velocity signal representing the rate of change of position of the rotor relative to the stator;
   (2) periodically producing, in response to the actual position signal and the velocity signal, commutation pattern control signals defining a pattern of field coils to be energized in a predetermined period;
   (3) periodically producing, in response to the actual position signal and the position command signal, a position error signal representing the difference between a desired position and the actual relative position of the rotor and stator;
   (4) periodically producing, in response to the position error signal, a velocity command signal;
   (5) periodically producing, in response to the velocity command signal and the velocity signal, a current command signal;
 c. means responsive to the current command signal, measured motor current, and the commutation pattern control signals for producing switch control signals; and,
 d. switch means responsive to the switch control signals for controlling the current through the field coils to control the relative position of the motor rotor and motor stator.

39. The apparatus of claim 38 wherein the processing means further comprises:
 a. means for storing input signals defining gain factors of a velocity loop transfer function, parameters of velocity feedback compensation, a motor torque constant and the moment of inertia of the motor with associated mechanical load;
 b. means responsive to the stored input signals, the velocity command signal, the velocity signal and a predetermined velocity loop transfer function for periodically calculating a motor current value required to produce the velocity represented by the velocity command signal.

40. The apparatus of claim 39 wherein the velocity loop transfer function defines control of the proportional plus integral type and the stored input signals representing gain factors include an integral gain factor and a proportional gain factor.

41. The apparatus of claim 39 wherein the velocity loop transfer function defines control of the pseudo derivative feedback type and the stored input signals representing gain factors include an integral gain factor and a pseudo derivative feedback gain factor.

42. The apparatus of claim 39 wherein the storing means further comprises means for storing adjust signals representing factors by which selected stored input signal values are to be modified and the processing means produces the current command signals in response to input signals modified in accordance with the adjust signals.

43. The apparatus of claim 38 wherein the processing means further produces a commutation anticipation signal defining an instant during the predetermined period when commutation is to occur.

44. The apparatus of claim 43 wherein the switch control signal producing means further comprises:
 a. means responsive to the current command signals and the measured motor current for producing pulse-width modulation signals for controlling the magnitude of motor current; and,
 b. means responsive to the commutation pattern control signals, the commutation anticipation signal, and the pulse-width modulation signals for producing the switch control signals.

45. The apparatus of claim 44 wherein the pulse-width modulation signal producing means includes an error amplifier providing a proportional-plus-integral transfer characteristic and the switch control signal producing means further comprises:
 a. means for selecting a proportional gain factor for the error amplifier; and
 b. means for selecting an integral time constant for the error amplifier.

46. The apparatus of claim 45 wherein the storing means further comprises means for storing input signals defining a selection of proportional gain for the error amplifier and a selection of an integral time constant of the error amplifier.

* * * * *